(12) United States Patent
Levin

(10) Patent No.: US 12,032,793 B2
(45) Date of Patent: Jul. 9, 2024

(54) TOUCHSCREEN FOR DETECTING TOUCH EVENTS BASED ON DIRECT LIGHT PATHS

(71) Applicant: ELBIT SYSTEMS LTD., Haifa (IL)

(72) Inventor: Samuel Levin, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 18/149,379

(22) Filed: Jan. 3, 2023

(65) Prior Publication Data

US 2023/0143276 A1 May 11, 2023

Related U.S. Application Data

(63) Continuation of application No. PCT/IL2021/050799, filed on Jun. 29, 2021.

(30) Foreign Application Priority Data

Jul. 1, 2020 (IL) .......................................... 275807

(51) Int. Cl.
*G06F 3/042* (2006.01)
*G06F 3/041* (2006.01)

(52) U.S. Cl.
CPC ........ *G06F 3/0428* (2013.01); *G06F 3/04166* (2019.05); *G06F 3/0418* (2013.01); *G06F 3/0421* (2013.01); *G06F 2203/04107* (2013.01)

(58) Field of Classification Search
CPC .. G06F 3/0428; G06F 3/04166; G06F 3/0418; G06F 3/0421; G06F 2203/04107
See application file for complete search history.

(56) References Cited

U.S. PATENT DOCUMENTS

| | | | |
|---|---|---|---|
| 2009/0002329 A1 | 1/2009 | Van Genechten et al. | |
| 2009/0135162 A1 | 5/2009 | Van De Wijdeven et al. | |
| 2010/0315380 A1 | 12/2010 | Yen et al. | |
| 2011/0186718 A1* | 8/2011 | Tanaka .................. | G06F 3/0421 250/231.1 |
| 2012/0105762 A1* | 5/2012 | Que .................. | G02F 1/133615 362/612 |
| 2013/0329456 A1* | 12/2013 | Huang ................. | G02B 6/0031 362/608 |
| 2015/0199072 A1* | 7/2015 | Zhang .................. | G06F 3/0421 345/175 |
| 2018/0143738 A1 | 5/2018 | Drumm et al. | |

* cited by examiner

*Primary Examiner* — Afroza Chowdhury
(74) *Attorney, Agent, or Firm* — William H. Dippert; Laurence A. Greenberg; Werner H. Stemer

(57) ABSTRACT

A touch screen (TS) comprises a display; a frame with edges positioned opposite each other around the display; at least a first sensor array and at least a second sensor array, wherein each of the sensor arrays has a plurality of light transmitters and a plurality of light sensors, and wherein the at least first sensor array and the at least second sensor array are disposed on the first edge and the second edge of the frame, respectively, wherein the transmitters of the first sensor array are facing the light sensors on the second sensor array positioned on two opposing edges of the frame; and at least one physical obstacle located on the third edge or the fourth edge, for reducing stray light scattered or reflected by third edge or the fourth edge and arriving to the light sensors.

20 Claims, 15 Drawing Sheets

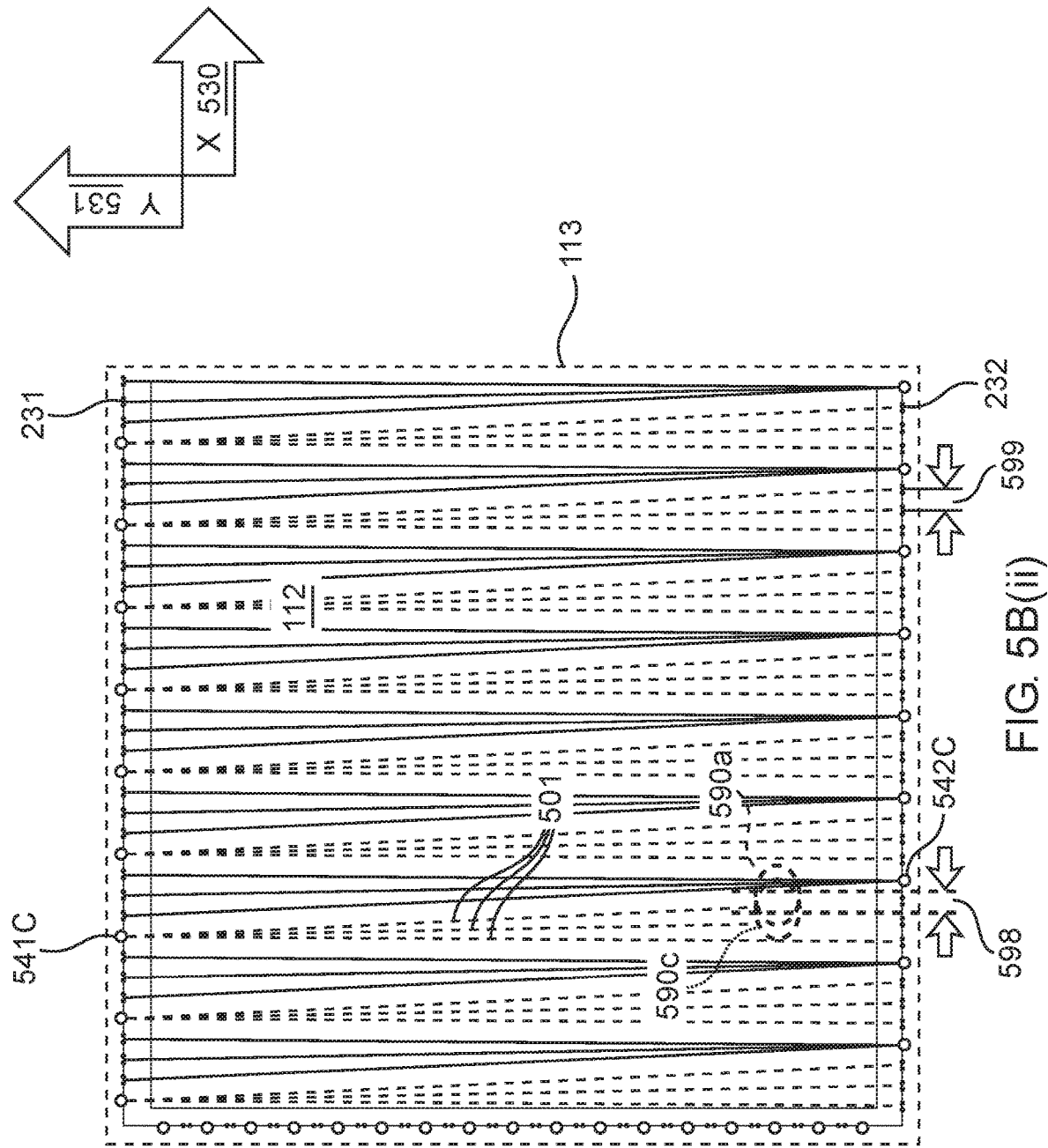

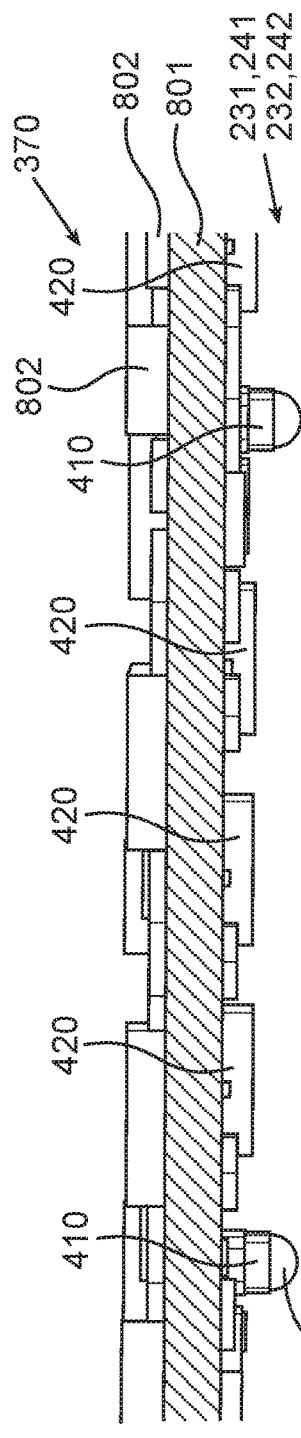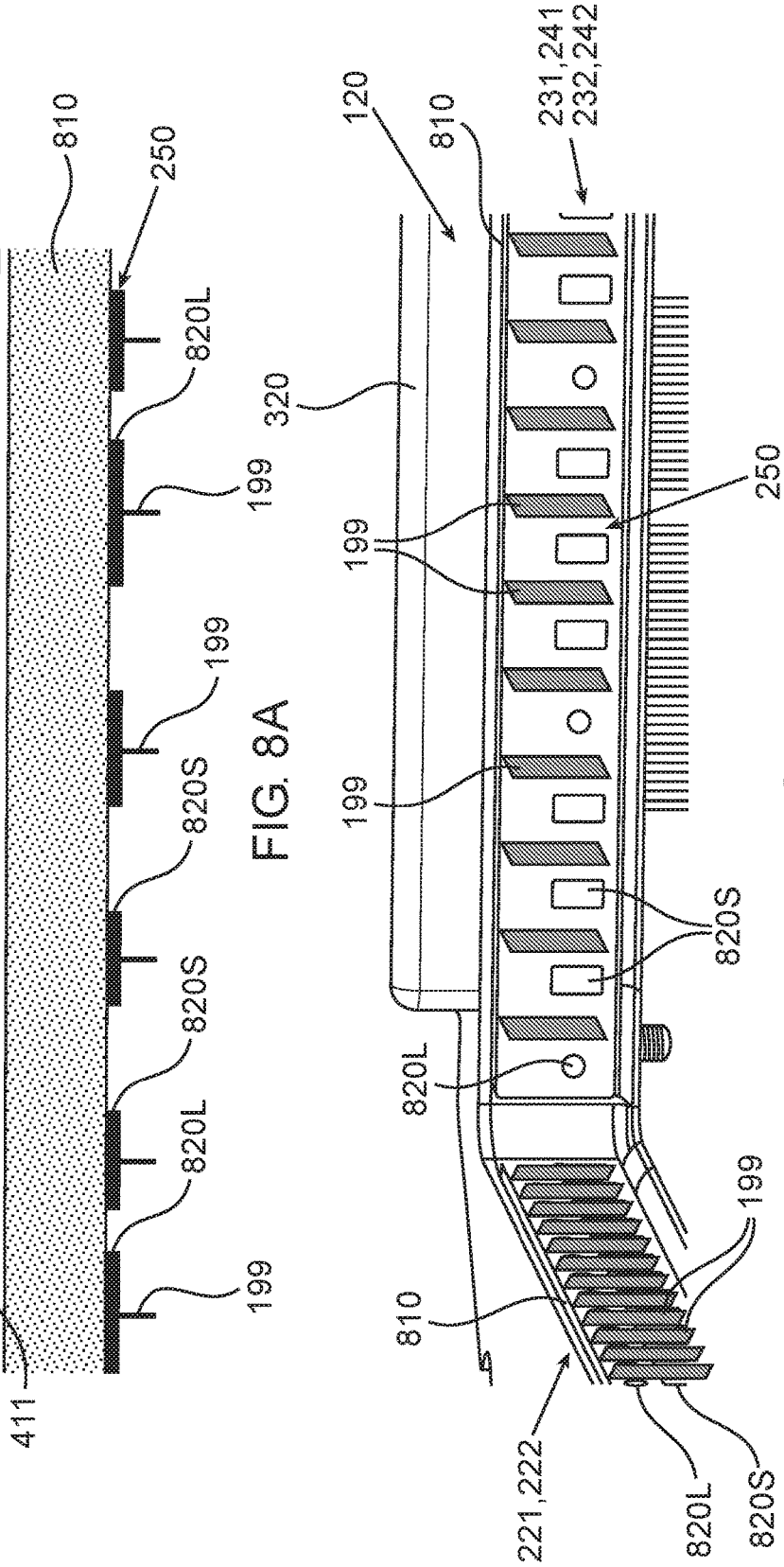

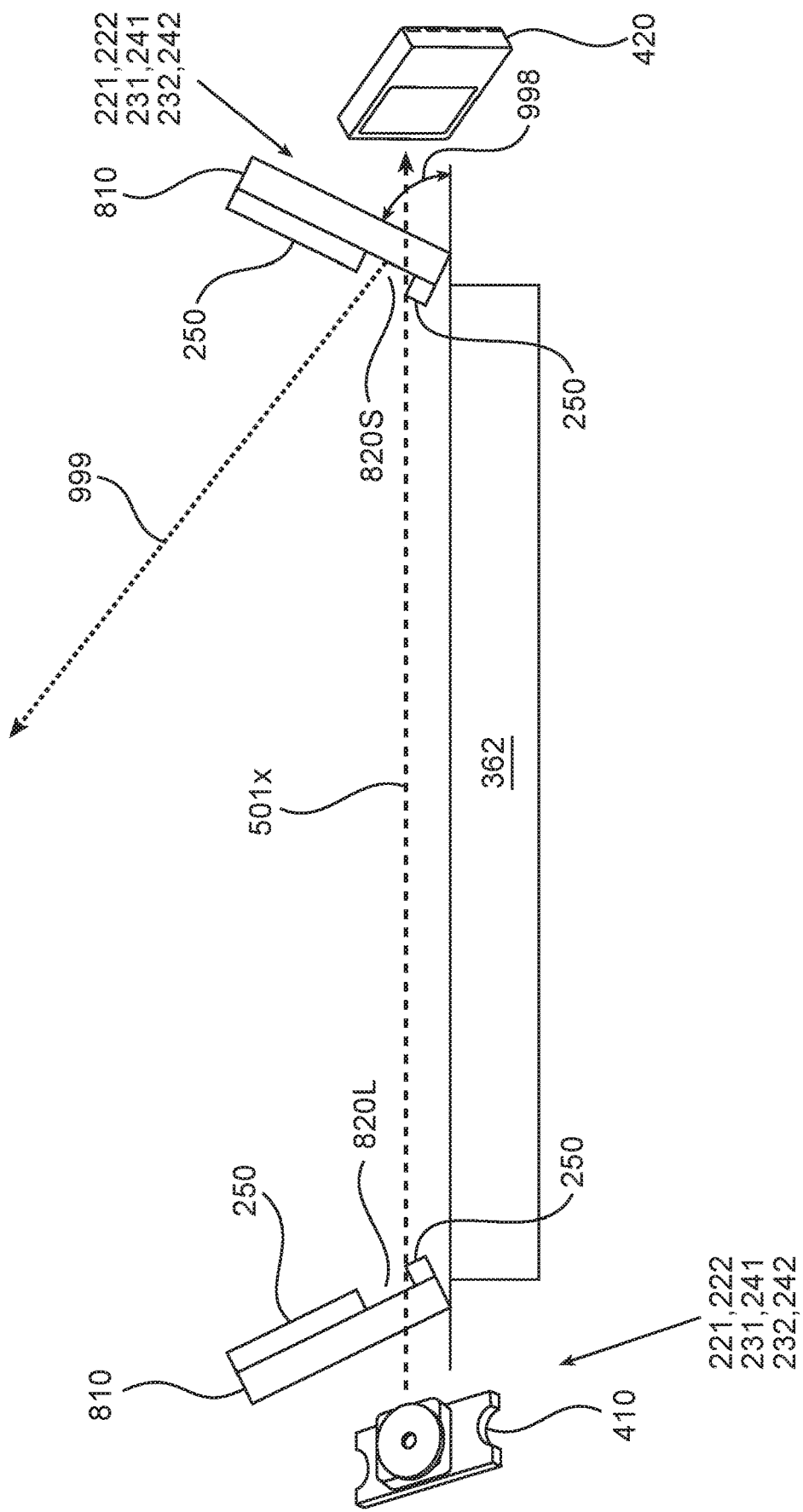
FIG. 9A(ii)

TOUCHSCREEN FOR DETECTING TOUCH EVENTS BASED ON DIRECT LIGHT PATHS

CROSS-REFERENCE TO RELATED APPLICATIONS

This application is a bypass continuation of co-pending PCT Patent Application No. PCT/IL2021/050799, filed Jun. 29, 2021, which is based upon and claims priority to Israeli Patent Application No. 275807, filed Jul. 1, 2020, the contents of each of which are incorporated herein by reference in their entirety.

TECHNICAL FIELD OF THE INVENTION

The present disclosed subject matter relates to touchscreens. More particularly, the present disclosed subject matter relates to a touchscreen having optical touch sensors arrays.

BACKGROUND OF THE INVENTION

Touch screens are commonly used as pointing sensors to provide a man-machine interface for computer driven systems. Several methods are known in the art for detecting and determining the location of touch events on the surface of the display screen.

Among the detection and determination methods, optical touch screen uses a number of infrared optical emitters (i.e., transmitters) and detectors (i.e., receivers) that are arranged around the periphery of the display screen to create a plurality of intersecting light paths.

US20090135162A1 to Sander B. F. Van De Wijdeven, et al., titled "System and Method for Detecting the Location, Size and Shape of Multiple Objects That Interact With a Touch Screen Display", discloses a system for detecting the location, size and shape of an object, or multiple objects, placed on a plane within the touch sensor boundaries of a touch screen.

SUMMARY OF THE INVENTION

It is an object of the present subject matter to provide, in accordance with a preferred embodiment, a touch screen (TS) apparatus comprising:
  a display;
  a frame with at least a first edge, a second edge, a third edge and a fourth edge around the display, wherein the first edge and the second edge are positioned opposite each other, and the third edge and the fourth edge are positioned opposite each other;
  at least a first sensor array and at least a second sensor array, wherein each of the sensor arrays has a plurality of light transmitters and a plurality of light sensors, and wherein the at least first sensor array and the at least second sensor array are disposed on the first edge and the second edge of the frame, respectively, wherein the transmitters of the first sensor array are facing the light sensors on the second sensor array positioned on two opposing edges of the frame; and
  at least one physical obstacle, located on at least one of the third edge or the fourth edge, for reducing stray light scattered or reflected by said at least one of the third edge or the fourth edge and arriving to the light sensors, wherein light from each of the light transmitters in one of the first sensor array and the second sensor array is directed along a direct light path to be detected by at least one light sensor of other sensor array, and wherein when at least one direct path between one of the light transmitters in one sensor array and at least one corresponding light sensor of the other sensor array is blocked, a touch event is detected, and a location of the touch event is determined based on a location of the direct path that is blocked.

In accordance with another preferred embodiment of the present subject matter, said at least one physical obstacle is selected from a group of obstacles consisting of: a plurality of guards protruding from the edges, an optical filter tilted in respect to a surface of the display, and windows in a cover positioned in front of the light sensors.

In accordance with another preferred embodiment of the present subject matter, the guards are thin opaque sheets normal to the edge to which they are attached.

In accordance with another preferred embodiment of the present subject matter, the guards are placed between two adjacent light sensors or two adjacent light transmitters.

In accordance with another preferred embodiment of the present subject matter, the guards are normal to the cover.

In accordance with another preferred embodiment of the present subject matter, the guards have a length between 1 mm and 5 mm.

In accordance with another preferred embodiment of the present subject matter, the guards have a length between 3 mm and 4 mm.

In accordance with another preferred embodiment of the present subject matter, the cover further comprises a corresponding window positioned in front of each of the light transmitters for limiting spread of light transmitted by said light transmitters.

In accordance with another preferred embodiment of the present subject matter, the cover is configured to protect the arrays.

In accordance with another preferred embodiment of the present subject matter, the cover is in a right angle to the display.

In accordance with another preferred embodiment of the present subject matter, wherein the cover is tilted outwardly in respect to the display.

In accordance with another preferred embodiment of the present subject matter, the light transmitters are sequentially powered to transmit a burst of light pulses.

In accordance with another preferred embodiment of the present subject matter, the light transmitters are sequentially powered to transmit a burst of light pulses at power level higher than a power level that the transmitters are capable to be powered in continuous operation.

In accordance with another preferred embodiment of the present subject matter, the physical obstacle prevents the light sensor from saturation when the TS is operating while exposed to sunlight.

In accordance with another preferred embodiment of the present subject matter, the physical obstacle that prevents the light sensor from saturation when the TS is operating while exposed to sunlight is an optical filter for blocking light having wavelength shorter than the light transmitted by the light transmitters.

In accordance with another preferred embodiment of the present subject matter, an optical filter is placed in front of the light transmitters.

In accordance with another preferred embodiment of the present subject matter, the physical obstacle that prevents the light sensors from saturation when the TS is operating while exposed to sunlight is an optical filter for blocking light having wavelength shorter than the sensitivity wavelength of a night vision system.

In accordance with another preferred embodiment of the present subject matter, the light transmitters and the light sensors are organized in the sensor arrays in a single row.

In accordance with another preferred embodiment of the present subject matter, each of the sensor arrays comprises more light sensors than light transmitters.

In accordance with another preferred embodiment of the present subject matter, each of the sensor arrays is organized to have repeating groups comprising three light sensors and one light transmitter.

In accordance with another preferred embodiment of the present subject matter, the display comprises two halves: a left side screen and a right side screen.

In accordance with another preferred embodiment of the present subject matter, each of the two halves is a separate display.

In accordance with another preferred embodiment of the present subject matter, the sensor arrays that are positioned on opposite edges are identical.

In accordance with another preferred embodiment of the present subject matter, the sensor arrays are located above the surface of the display.

It is also provided, in accordance with another preferred embodiment of the present subject matter, a sensor array for detecting and locating a touch event on a touch screen (TS) having at least a first edge, a second edge, a third edge, and a fourth edge around a touch active surface, wherein the first edge and the second edge are opposing each other, and the third edge and the fourth edge are opposing each other, and having at least a first sensor array and a second sensor array positioned on the first edge and the second edge, respectively, each of the sensor arrays comprising:
- a plurality of light sensors organized in a light sensors' row configured to be positioned adjacent to the touch active surface of the TS; and
- a plurality of light transmitters organized in a transmitters' row positioned adjacent to and above the light sensors' row in respect to the touch active surface, wherein light from at least one of the light transmitters of one of the sensor arrays forms at least one direct path of light that is detected by at least one light sensor in another sensor array oppositely positioned, and wherein when the touch active surface of the TS is touched by a touching object, the at least one direct path of light is blocked, the touch event is detected, and wherein the location of the touch event is determined based on the location of the at least one direct path of light that is blocked; and
- at least one physical obstacle located on at least one of the third edge or the fourth edge, for reducing stray light arriving to the light sensors,
- wherein said stray light is light that is:
  - emitted by a transmitter of the plurality of light transmitters of the first sensor array,
  - scattered or reflected by structure on at least one of the third edge or the fourth edge, and
- detected by a light sensor on the second sensor array.

In accordance with another preferred embodiment of the present subject matter, the touching object is an opaque object capable of blocking the at least one direct path of light.

In accordance with another preferred embodiment of the present subject matter, the opaque object is ⅛" or larger.

In accordance with another preferred embodiment of the present subject matter, the opaque object is detected when it touches any location on the active surface of the TS.

In accordance with another preferred embodiment of the present subject matter, the opaque object is selected from a group of objects consisting of finger, gloved finger, stylus.

In accordance with another preferred embodiment of the present subject matter, the TS and the touch active surface are rectangular.

In accordance with another preferred embodiment of the present subject matter, the sensor array comprises more light sensors than light transmitters.

In accordance with another preferred embodiment of the present subject matter, the light transmitters are oriented so that a light emitting area of at least one of the light transmitters is close to a light sensor.

It is yet another object of the present subject matter to provide a method of detecting a location of a touch event in a rectangular touch screen (TS) apparatus having a rectangular display divided to a first side and a second side located one aside the other, the rectangular display has at least a first edge, a second edge, a third edge, and a fourth edge such that the first edge and the second edge that opposes the first edge are longer than the third edge and the fourth edge that opposes the third edge; the TS further has at least a first sensor array and at least a third sensor array, positioned near the first side and the second side of the display, respectively, and along the first edge; at least a second sensor array and at least a forth sensor array, positioned near the first side and the second side, respectively, along the second edge; at least a fifth sensor array and at least a sixth sensor array, positioned near the first side along the third edge and near the second side along the fourth edge, respectively, wherein each one of the sensor arrays comprises light transmitters and light sensors;

the method comprising:
a first sequence comprising:
concurrently activating in sequence, one at a time, the light transmitters in the first sensor array and in the third sensor array to transmit light towards light sensors in the second sensor array and the fourth sensor array, respectively, each along a direct light path; and
determining if at least one direct light path of the direct light paths between any of the light transmitters in the first sensor array and the light sensors in the second sensor array is blocked;
if during the first sequence, at least one direct light path is blocked, starting a third sequence wherein the third sequence comprising:
activating in sequence, one at a time, the light transmitters in the fifth sensor array to transmit light towards light sensors in the sixth sensor array;
determining which of the direct light paths is blocked; and
determining the location of the touch event based on the at least one direct light path that is blocked;
if the direct light path that is blocked is between a light transmitter that is activated in the third sensor array and a light sensor in the fourth sensor array, starting a fourth sequence comprising:
activating is sequence, one at a time, the light transmitters in the fifth sensor array to transmit light towards light sensors in the sixth sensor array;
determining which of the direct light path or direct light paths are blocked; and
determining the location of the touch event based on the at least one direct light path that is blocked;
and
if during the first sequence no direct light path is determined to be blocked, starting a second sequence comprising:

concurrently activating is sequence, one at a time, the light transmitters in the second sensor array and forth sensor array to transmit light towards light sensors in the first sensor array and the third sensor array, respectively; and determining if a direct light path between any of the light transmitters in the second sensor array and the fourth sensor array and the light sensors in the first sensor array and the fourth sensor array, respectively, is blocked;

if during the second sequence:
a direct light path is blocked between a light transmitter in the second sensor array and a light sensor in the first sensor array, starting the third sequence;
if during the second sequence:
a direct light path is blocked between a light transmitter in the fourth sensor array and a light sensor in the third sensor array, starting the fourth sequence; and
if during the second sequence no direct light path is blocked, starting first sequence again.

In accordance with another preferred embodiment of the present subject matter, the method further comprising:
if during the third sequence or the fourth sequence following the first sequence, at least one direct path is determined to be blocked from the light transmitters closer to the first sensor array or the third sensor array,
starting the second sequence; and
updating the location of the touch event based on the direct light path that is blocked; and
if during the third sequence or a fourth sequence following the second sequence, a direct path is determined to be blocked from the light transmitter closer to the second sensor array or the fourth sensor array,
starting the first sequence; and
updating the location of the touch event based on at least one direct light path that is blocked.

In accordance with another preferred embodiment of the present subject matter, the method further comprising:
if the touch event is no longer detected, returning to the first sequence.

In accordance with another preferred embodiment of the present subject matter, the method further comprising:
independently powering and controlling the first side of the display and the second side of the display by different power and control sub-systems.

In accordance with another preferred embodiment of the present subject matter, the display is a rectangular display divided to a first side and a second side located one aside the other, the rectangular display has four edges such that a first edge and an opposing second edge are longer than a third edge and an opposing forth edge,
and wherein the first and the second sensor arrays are located opposite each other along the first edge and an opposing second edge respectively near the first side of the display, the TS further comprising:
at least a third sensor array and at least a fourth sensor array along the first edge and an opposing second edge respectively near the second side of the display;
at least a fifth sensor array and at least a sixth sensor array, positioned near the first side along the third edge and near the second side along the fourth edge, respectively, wherein each one of the sensor arrays comprises light transmitters and light sensors.

In accordance with another preferred embodiment of the present subject matter, in the first, the second, the third and the fourth sensor arrays the plurality of light transmitters and light sensors are organized in a single row.

In accordance with another preferred embodiment of the present subject matter, in the first, the second, the third and the fourth sensor arrays the light transmitters and light sensors are organized in repeated groups of one light transmitter and a plurality of light sensors.

In accordance with another preferred embodiment of the present subject matter, in the first, the second, the third and the fourth sensor arrays each group comprises one light transmitter and three light sensors.

In accordance with another preferred embodiment of the present subject matter, in the fifth and the sixth sensor arrays the plurality of light transmitters organized in a transmitters' row positioned adjacent to and above the light sensors' row in respect to the touch active surface.

In accordance with another preferred embodiment of the present subject matter, said at least one physical obstacle comprises, an optical filter placed in front of the light transmitters.

In accordance with another preferred embodiment of the present subject matter, said at least one physical obstacle comprises, an optical filter placed in front of the light sensors.

In accordance with another preferred embodiment of the present subject matter, the apparatus further comprising a third sensor array and a fourth sensor array disposed on the third edge and the forth edge of the frame, respectively, wherein said at least one physical obstacle comprises four physical obstacles, respectively located on the first, second, third and fourth edge.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

The features as indicated above can be combined individually or all together.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the Drawings:

FIG. 5B(ii) schematically illustrating inaccuracies in top-to-bottom touch location determination, in accordance with some exemplary embodiments of the disclosed subject matter;

FIG. 8A schematically illustrates a cross section of a top or bottom array, in accordance with some exemplary embodiments of the disclosed subject matter;

FIG. 8B schematically illustrates an isometric view of the frame and covers of both types of arrays, in accordance with some exemplary embodiments of the disclosed subject matter;

FIG. 9A(ii) schematically illustrating the use of tilted filters to deflect reflected light away from the ST, in accordance with some exemplary embodiments of the disclosed subject matter;

DETAILED DESCRIPTION OF THE INVENTION

Figure 1:
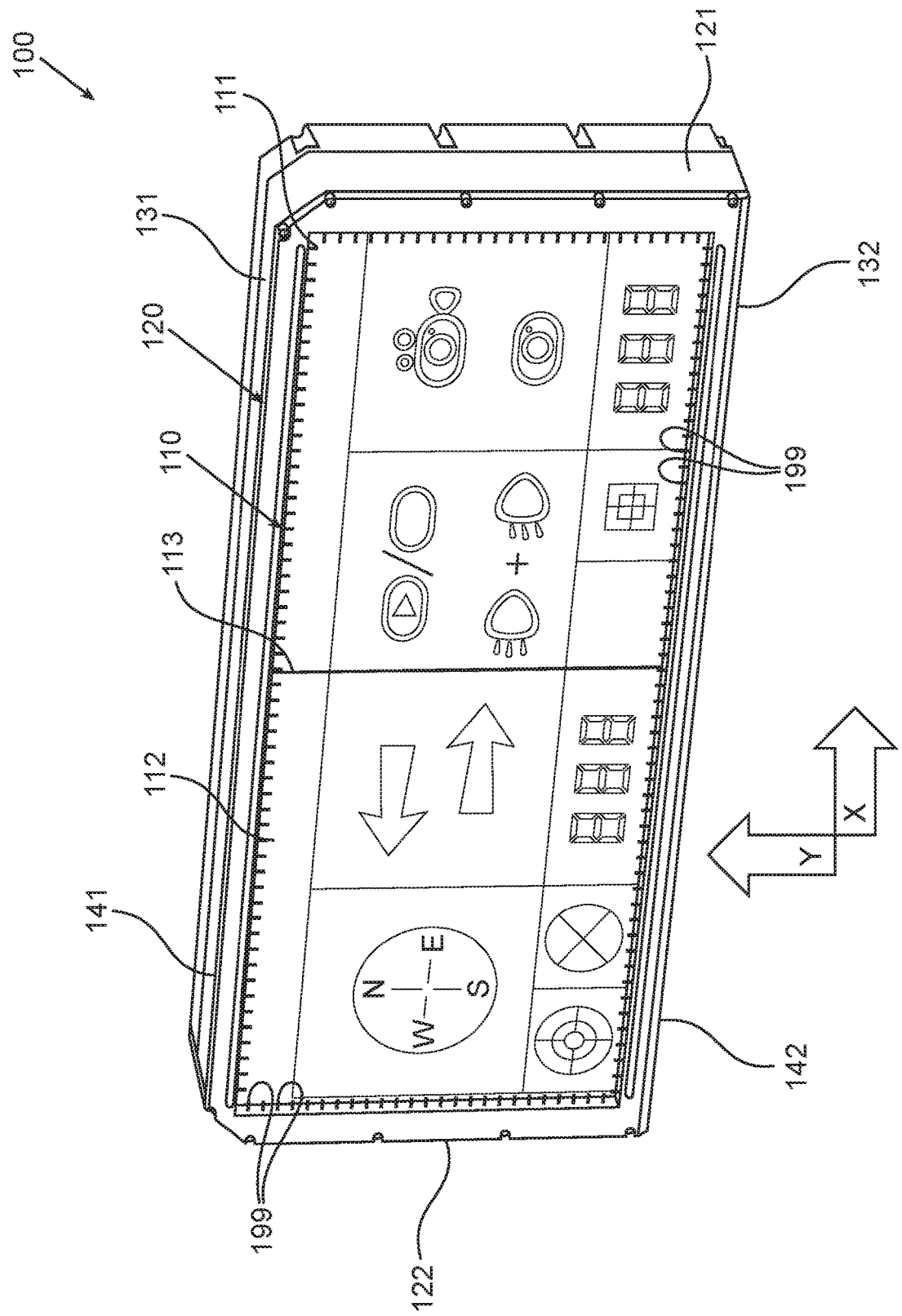
FIG. 1 schematically illustrates a general view of a display unit, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Similar elements may be marked with letters following the same numeral. A numeral followed by the letter/s "x" or "Xx" refers to any or all of the same type of elements.

Referring to FIG. 1 schematically illustrating a general view of a display unit, in accordance with some exemplary embodiments of the disclosed subject matter.

The touch screen (TS) 110 comprises:

A rectangular display having a long dimension (X) and a short dimension (Y). It should be understood that the terms used herein "Y", "Y", "left". "right", "top", "bottom", etc. are for convenient only and do not intend to define direction relative to the gaze of the user or the earth gravity. The current subject matter may be used for example with a maneuvering airplane where the directions up and down may change, or if the display is installed such that its long dimension is vertical or oblique, and similarly, if the system undergoes symmetry reversal such as reflection, mirroring or rotation. It is now defined that TS has a right side screen 111 and a TS left side screen 112. The display can be a rectangular single display, two side by side displays meeting at adjacent edges 113. Optionally, the adjacent edges or S113 can be covered by a mullion. The TS can be physically or logically divided to a larger array of "sided" such as an additional "central screen" in between the right side screen 111 and the TS left side screen 112.

The right side screen 111 and the left side screen 112 are "night vision system" (NVIS) compatible (to be detailed later in this document).

Screens 111 and 112 are within a TS frame 120 and are having: a right side section 121, a left side section 122, a top right section 131, bottom right section 132, a top left section 141, and a bottom left section 142.

TS frame 120 houses touch detection and location arrays as well as guard protrusions 199 (shown better in FIG. 3) to reduce light bypassing an object touching the screen from arriving to the sensors and interfering with the operation of the touch detection and location arrays.

Light arriving to the sensors and interfering with the operation of the touch detection and location arrays can be light that is generated by a light source such as a LED in one touch detection and location array and traveled not in the direct optical path between that light source to a light sensor in another detection and location array. The interfering light takes an indirect path, such as being reflected or scattered by an element of the TS or other structures nearby. In the text below, light arriving to the sensors and interfering with the operation of the touch detection and location arrays taking the above indirect path or paths may be named as "scattered light". Some details of scattered light will be discussed in reference to FIG. 2, In contrast, the "direct optical path" of light that is generated by a light source in one touch detection and location array and travels in the direct optical path between that light source to a light sensor in another detection and location array will be referred in the text simply as "path" or "direct path".

Optionally, guard protrusions 199 are of different shapes or lengths. For example, guard protrusions 199 on the sides of the TS can be of different length than the guard protrusions 199 on the top and/or the bottom of the ST. Optionally, guard protrusions 199 are missing on one or few edges of the ST.

Figure 2:
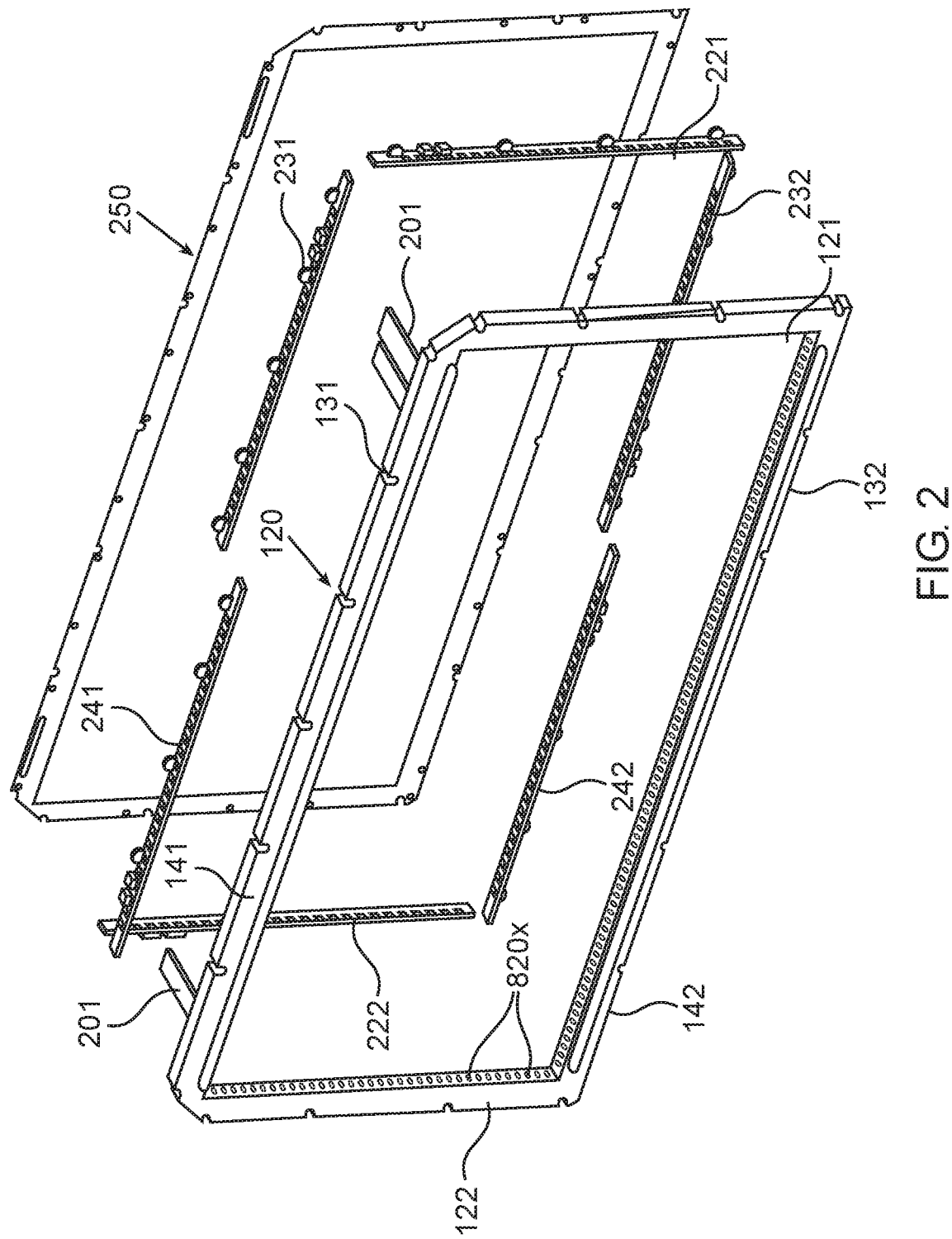
FIG. 2 schematically illustrates an exploded view of a frame and sensor arrays of a display unit, in accordance with some exemplary embodiments of the disclosed subject matter.

It should be noted that exemplary embodiments of the current subject matter are configured to be used with different sizes of touchscreens, for example large TS may be used. For example, a width of TS 110 can be over to 50 cm Referring now to FIG. 2 schematically illustrating an exploded view of the frame and sensor arrays of a display unit, in accordance with some exemplary embodiments of the disclosed subject matter.

The TS frame 120 accommodates touch sensors that will be comprehensively disclosed later on in this document. The frame is further provided with connecting members 201 for connecting the TS frame 120 to the support structure (shown in FIG. 3).

Sensor arrays are also provided to the frame while each array of sensors comprises light transmitters (LEDs) and light sensors (to be detailed in FIGS. 3-6, 8A-B). Right array 221 and left array 222 are similar or optionally identical. Right array 221 and left array 222 are provided on both sides, and top right array 231, bottom right array 232; top left array 241, and bottom left array 242 are correspondingly provided, forming an inner frame. Top right array 231, bottom right array 232; top left array 241, and bottom left array 242 are similar or optionally identical.

It should be noted that the arrays are arranged and works as opposing couples: 421 with 242; 231 with 232; and 221 with 222. That is, light emitted by one array is to travel via a direct path to its opposing counterpart when the screen is not touched. Light traveling via an indirect path, for example by reflection or scattering by the frame or another (not the opposing) array, may provide enough light to the sensors, thus preventing detection of the blocking of the direct path. For example, light emitted from array 241 may be reflected or scattered towards array 242 by array 222 or the frame or other structure in front or near array 221. Similarly, light from array 222 may be reflected or scattered towards array 222 by any of arrays 231, 232, 241, and 242, or the frame or other structure in front or near these arrays. Guards 199 strongly reduces the reflected or scattered light via these indirect paths. Additionally, as will be seen in reference to FIG. 9A(ii), tilting the covers 250 and or filters 810 further reduces the reflected light via these indirect paths.

Guards 199 (which may be seen in more details in FIGS. 3 and 8B) may be made as thin sheets, for example metal, or opaque material, attached or part of the frame 120, or parts of or attached to other parts of the cover 250. The sheets do not block the direct paths from transmitters to receivers, but prevents light arriving at oblique angles from arriving at, reflecting from, or scattering from elements such as: the cover, the frame, filters, the receivers, and the transmitters.

A cover 250 is configured to cover and protect the arrays and to reduce the risk of sensing errors due to stray LED light reflections and blinding by sunlight. To reduce the risk of sensing errors, the cover further comprises guards 199 (to be seen in FIGS. 3, and 8A-B), a filter, and windows 820x for allowing light to exit from the LEDs and arrive to the light sensors (to be detailed in FIGS. 3, 8A-B and 9A-B).

Optionally, cover 250 is at a right angle to the surface of the TS 100. This reduces the width of the frame and allows larger display size to fit into the confined space. Alternatively, cover 250 is tilted outwardly in respect to the surface of TS 100, such that LED light not absorbed by a light sensor is predominantly reflected away from the TS surface.

In an exemplary embodiment, for example as seen here, the electro-optical elements of arrays 241, 231, 221, 232, 242, and 222 are above the surface of the display(s) used with the TS. Optionally, the entire printed board circuit (PCB) of the array are above the surface of the display(s) used with the TS.

Figure 3:
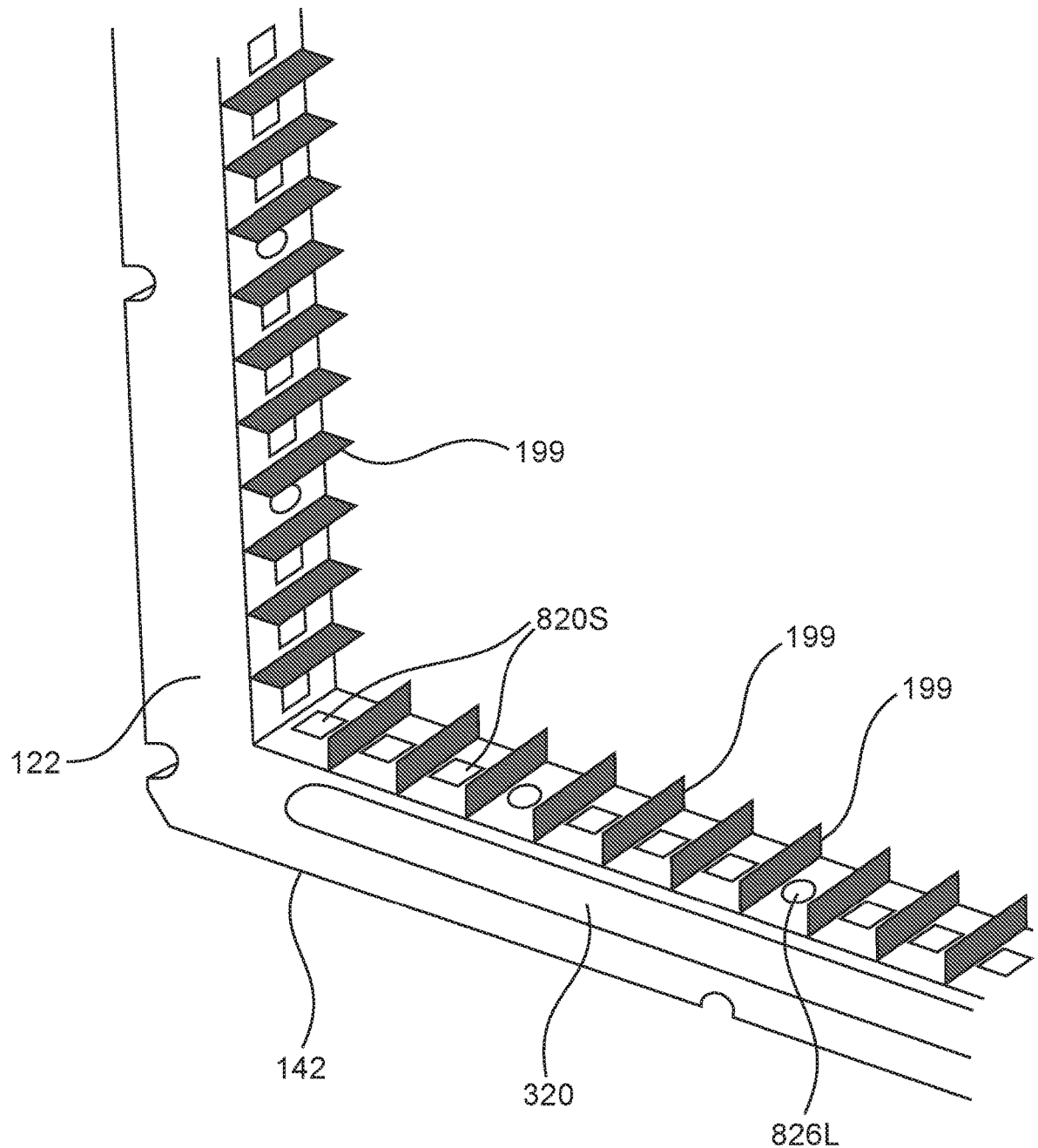
FIG. 3 schematically illustrates an element of the bottom left corner of FIG. 2, illustrating some details of the display unit frame, in accordance with some exemplary embodiments of the disclosed subject matter.

Referring now to FIG. 3, schematically illustrates an element of the bottom left corner shown in FIG. 2, illustrating some details of the display unit frame, in accordance with some exemplary embodiments of the disclosed subject matter.

The bottom left section 142 of TS frame 120 is having a rim 320 that can facilitate in stabilizing the hand of the user during touching the screen.

All sections of the TS frame (sections 122 and 142 are shown in FIG. 3) comprise windows 820x. Guards 199 protrude from the frame inwardly. Optionally, guards 199 are located between any two adjacent windows 820x along the edge of the frame. However, a guard can be located at larger intervals. In the depicted example, guards 199 are normal to the cover.

Guards 199 may be between 1 to 5 mm long, for example between 3 to 4 mm long, such that they minimally interfere with the visually useful surface of the TS display and its touch active surface.

Optionally, guards 199 protrude into the active surface of the display used with the TS. Optionally, the frame is constructed such that the entire length of guards 199 is over the active surface of the display used with the TS.

Figure 4A:
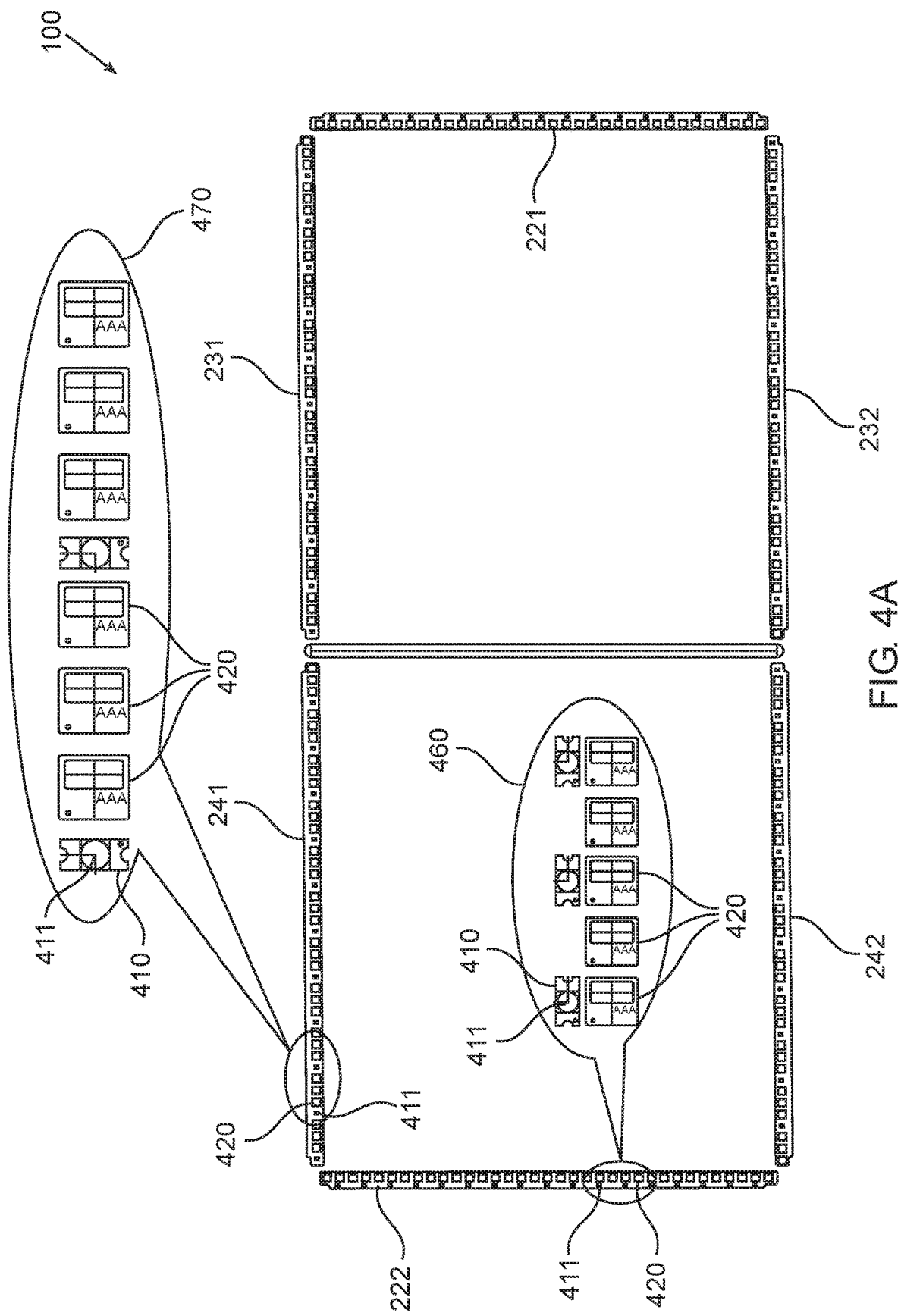
FIG. 4A schematically illustrates some details of the sensor arrays, in accordance with some exemplary embodiments of the disclosed subject matter.

Referring now to FIG. 4A schematically illustrating some details of the sensor arrays, in accordance with some exemplary embodiments of the disclosed subject matter.

Each array of sensors comprises LEDs 410 and light sensors 420 in repeated order. However, the configuration of the LEDs and the light sensors are not identical:

a) In the side arrays 222 and 221, the LEDs 410 and the light sensors 420 are arranged in two rows, wherein the LEDs 410 are positioned above the light sensors 420 (further from the surface of the display). Preferably but not necessarily, one LED 410 is placed above every second light sensor 420. As can clearly be seen in the enlargement 460 of a segment of the array 222, the LEDs 410 are oriented with their long side adjacent to the light sensor such that their light emitting area 411 is closer to the light sensor 420.

Figure 6:
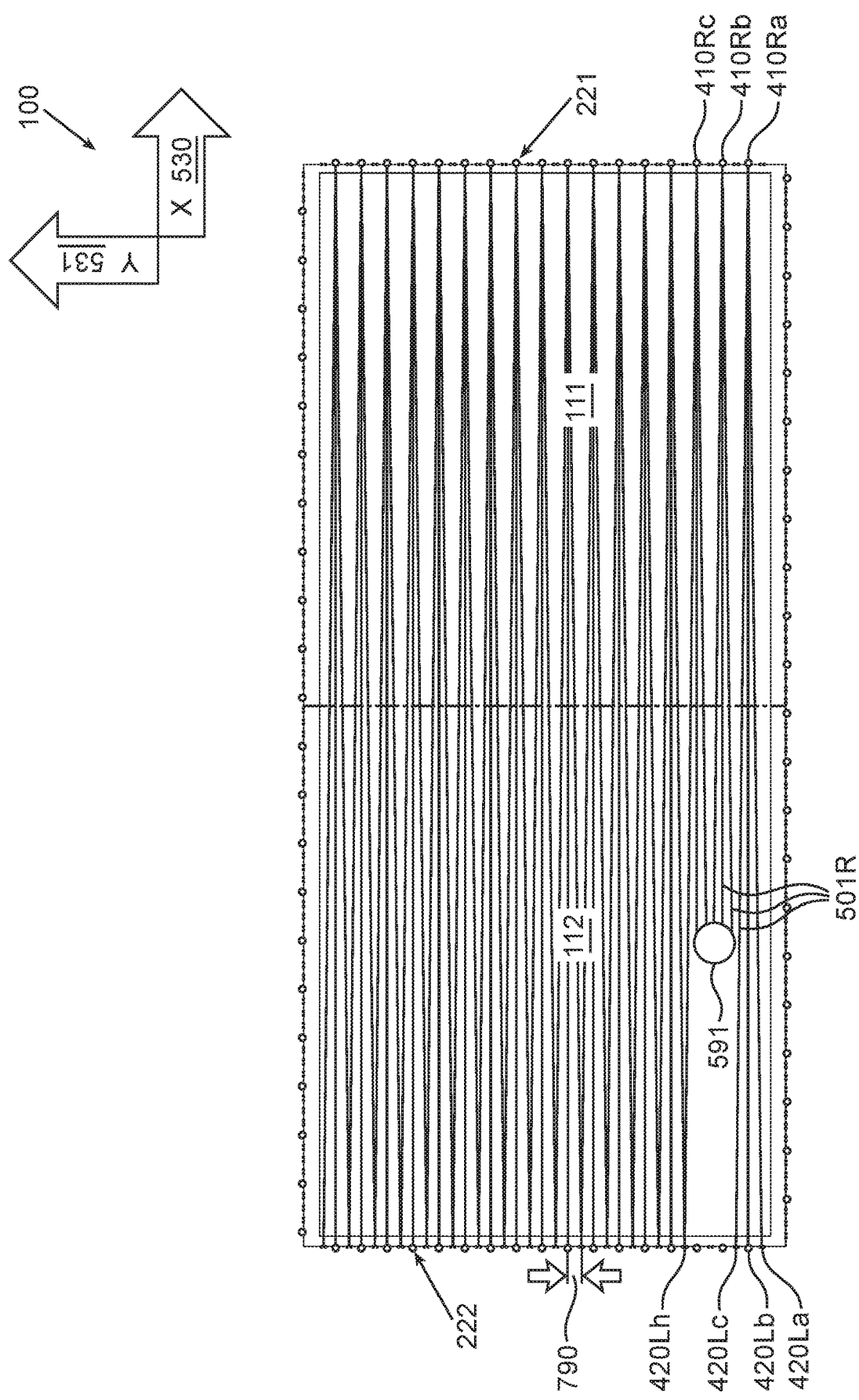
FIG. 6 schematically illustrates side to side touch location determination, in accordance with some exemplary embodiments of the disclosed subject matter.
Figure 7A:
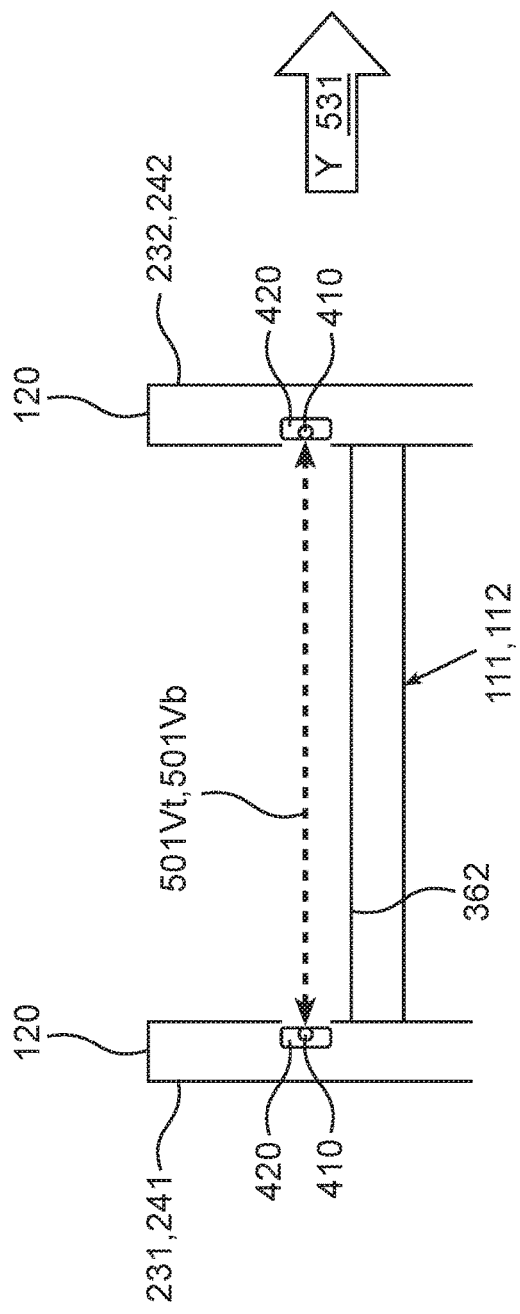
FIG. 7A schematically illustrates distances of the vertical light paths from the surface of the touch screen, in accordance with some exemplary embodiments of the disclosed subject matter.
Figure 7B:
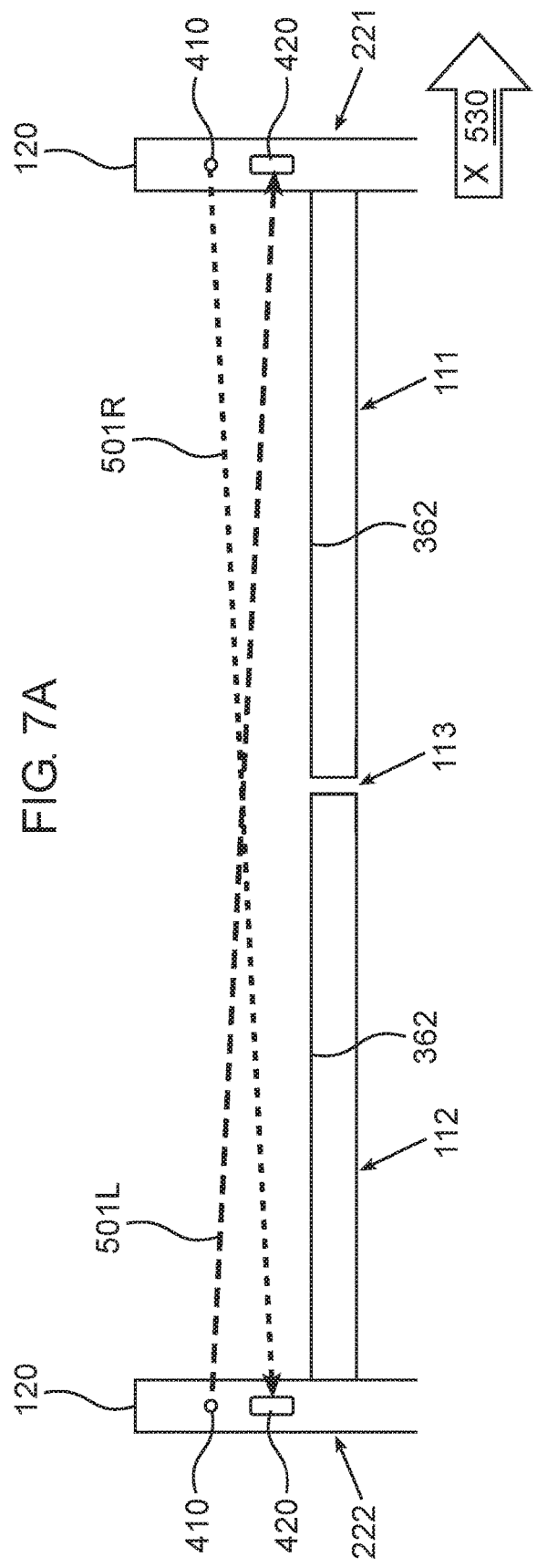
FIG. 7B schematically illustrates distances of the horizontal light paths from the surface of the touch screen, in accordance with some exemplary embodiments of the disclosed subject matter.

This arrangement of sensors facilitates increased resolution of the screen, and detection of a user's touch close to the screen (as will be detailed in FIGS. 6 and 7B). However, this arrangement should be viewed as a non-limiting example as exact configuration may depend on the dimensions of the LED and light sensor's components and their connections to the printed board circuit (PCB).

b) In the top and bottom arrays (232, 231, 241, 242), the LEDs 410 and light sensors 420 are positioned in one row. The LEDs 410 are preferably separated by three light sensors 420; the LEDs 410 are oriented with their long side vertical such as to minimize the gap between two light sensors 420 residing on both sides of the LED, as can be seen in corresponding enlargement 470. This arrangement allows increased resolution, and detection of a touch close to the screen as detailed in FIGS. 5 and 7A).

However, this arrangement should be viewed as a non-limiting example as exact configuration may depend on the dimensions of the LED and light sensor's components and their connections to the PCB.

In the non-limiting example, each side arrays have 35 light sensors and 17 LEDs.

In the non-limiting example, each top or bottom arrays have 33 light sensors and 11 LEDs.

It should be noted that other arrangements of arrays with different ratios between the number of LEDs and the light sensors are possible without limiting the scope of the disclosed subject matter.

Figure 4B:
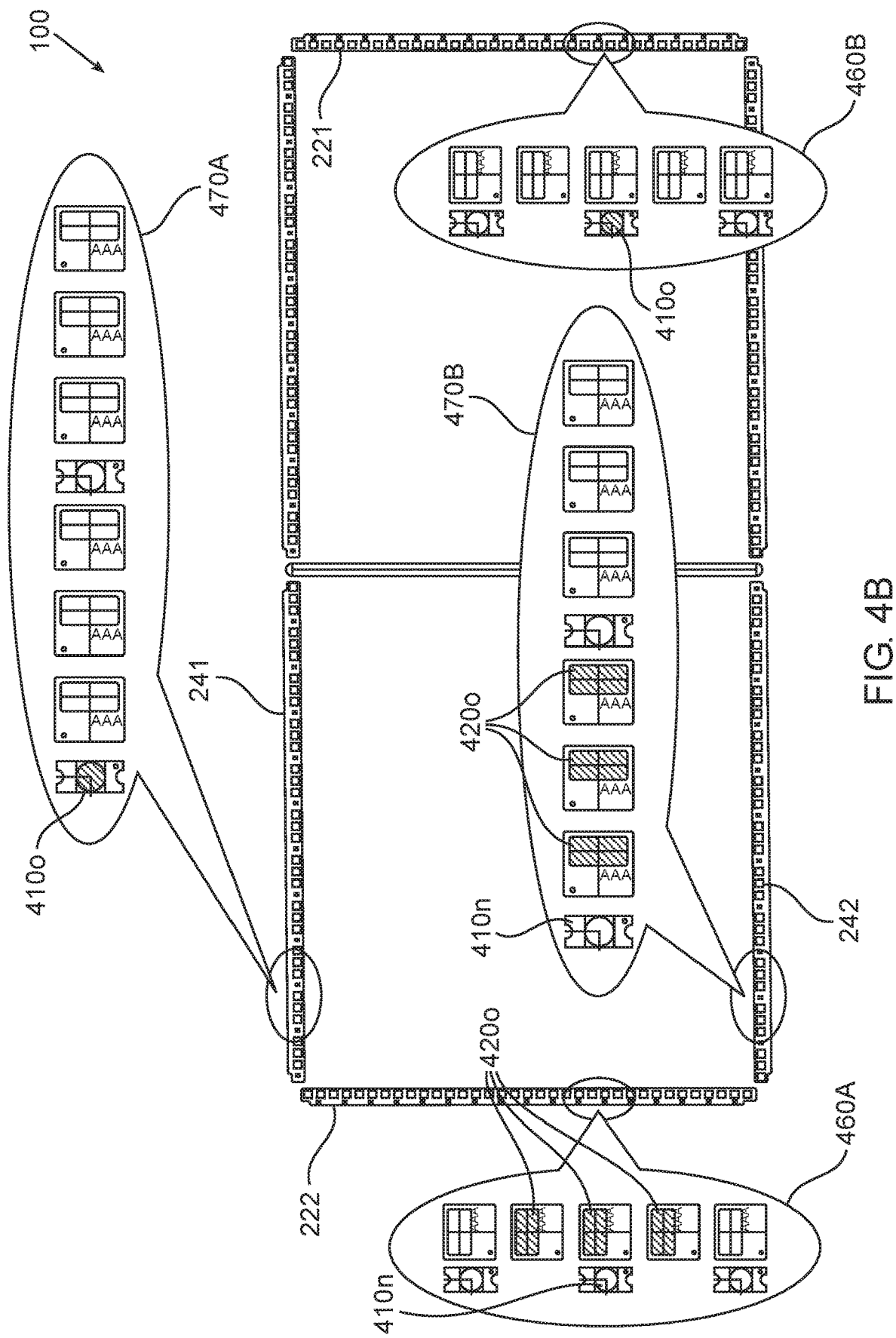
FIG. 4B schematically illustrates the grouping of the LEDs and the corresponding light sensors in the arrays, in accordance with some exemplary embodiments of the disclosed subject matter.

Referring now to FIG. 4B, schematically illustrating the grouping of the LEDs and the corresponding light sensors in the arrays, in accordance with some exemplary embodiments of the disclosed subject matter.

In this figure, the emission area of operating LED 410o in top left array 241 (better seen in enlargement 470A) and the active area of the corresponding three operating light sensors 420o (seen in enlargement 470B) in the opposite location in bottom left array 242 are seen in hatched coloring. It should be noted that in this non-limiting example, the operating sensors 420o are adjacent to one side of the non-operating LED 410n that is directly opposite to the operating LED 410o.

It should be noted that in this document, "operating LED" or "activated LED" is a LED that emits a burst of IR pulses at a preset frequency.

In this document, "probed light sensor", "operating light sensor" or "activated light sensor" is a light sensor that transmits its state: "detecting the LED light" or "light from the LED is blocked" to the controller controlling the TS unit.

The light sensor may be energized and operational while not active, for example to performs tasks such as light background subtraction, temperature compensation, and automatic gain control.

Similarly, in this figure, the emission area of operating LED 410o in array right 221 (shown in enlargement 460B) and the active area of the corresponding three operating light sensors 420o (shown in enlargement 460A) in the opposite location in left array 222 are seen in hatched coloring. Note that in this non-limiting example, the operating light sensors 420o are adjacent, below, and on both sides of the non-operating LED 410n that is directly opposite to the operating LED 410o.

Figure 5A:
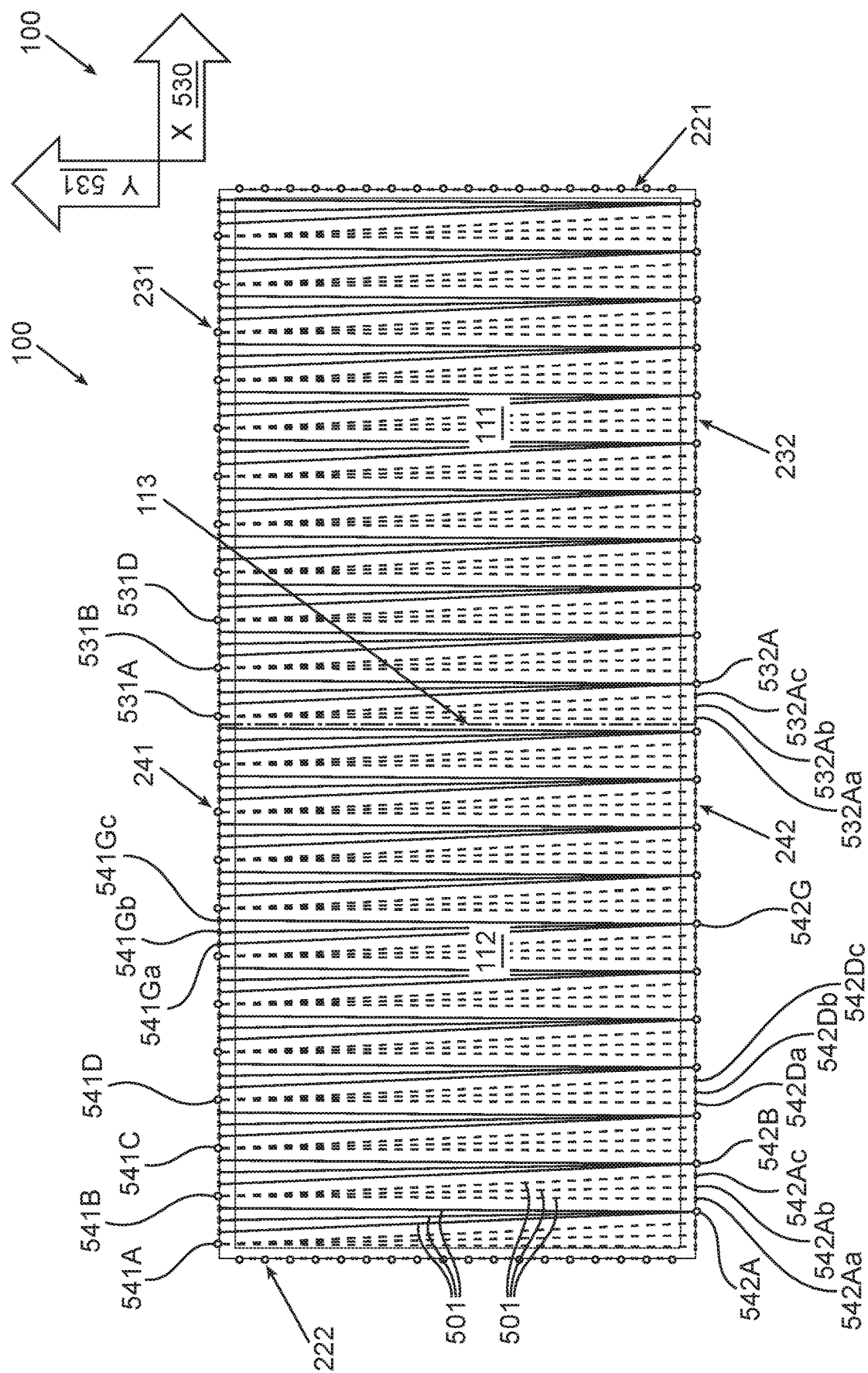
FIG. 5A schematically illustrates the top-to-bottom and bottom-to-top touch detection sequences, in accordance with some exemplary embodiments of the disclosed subject matter.

Referring now to FIG. 5A, schematically illustrating the top-to-bottom and bottom-to-top touch detection sequences, in accordance with some exemplary embodiments of the disclosed subject matter.

FIG. 5A illustrates the initial touch screen detection and determination of "X" coordinate 530. To reduce cluttering of the figure, only some of the components are marked.

In activated mode, the top (and bottom) arrays are constantly scanning for a "touch event" in which an object such as a finger, gloved finger, or a stylus interrupts at least one light path 501 between a LED 541X, 542X and a corresponding light sensor 542Xx, 541Xx.

The operation is first illustrated for a "top-to-bottom" scan, wherein LEDs 541A, 451B, 541C . . . 541X are activated one after the other in sequence. During activation of LEDs 541A, as an example, the corresponding light sensors 542Aa, 542Ab and 532Ac are also activated (in the sense that their state is considered by the controller in order to determine the location of a touch event).

If touch event was not detected, LEDs 541A and 531A and their corresponding light sensors are deactivated and the next LEDs 541B and 531B and their corresponding light sensors (not marked) are activated. Next, LEDs 541C is activated together with the corresponding (not marked) light sensors, and so on.

In the exemplary non-limiting example, both TS right side screen 111 and a TS left side screen 112 are concurrently scanned. For example, the detection sequence can start with top-to-bottom scan in the X direction 530 by activating LEDs 541A and the corresponding light sensors 542Aa, 542Ab and 542Ac; and at the same time, activating LED 531A and the corresponding light sensors 532Aa, 532Ab, and 532Ac.

Note that in this example of a concurrent top-to-bottom scanning, a distance of one half of the total width of the TS between the two active LEDs and the two group of active light sensors is maintained, thus reducing the risk of light scattered from one active LED arriving at a light sensor associated with the other activated LED, possibly causing missing a touch event. Yet the full scan time is reduced to one half of the time required in consecutive scanning of the two halves of the display. It should be noted that the number of concurrently activated LEDs can be more than two for further reducing the full scan time.

If the top-to-bottom scan is completed without detecting a touch event, a bottom-to-top scan begins by activating LED 542A and 532A and their corresponding light sensors. The bottom-to-top scan continues by sequentially activating the next LED 541X and 531X and their corresponding light sensors unless a touch was detected.

The sequence of top-to-bottom scan and bottom-to-top scan repeats until a touch event is detected.

Figure 5B:
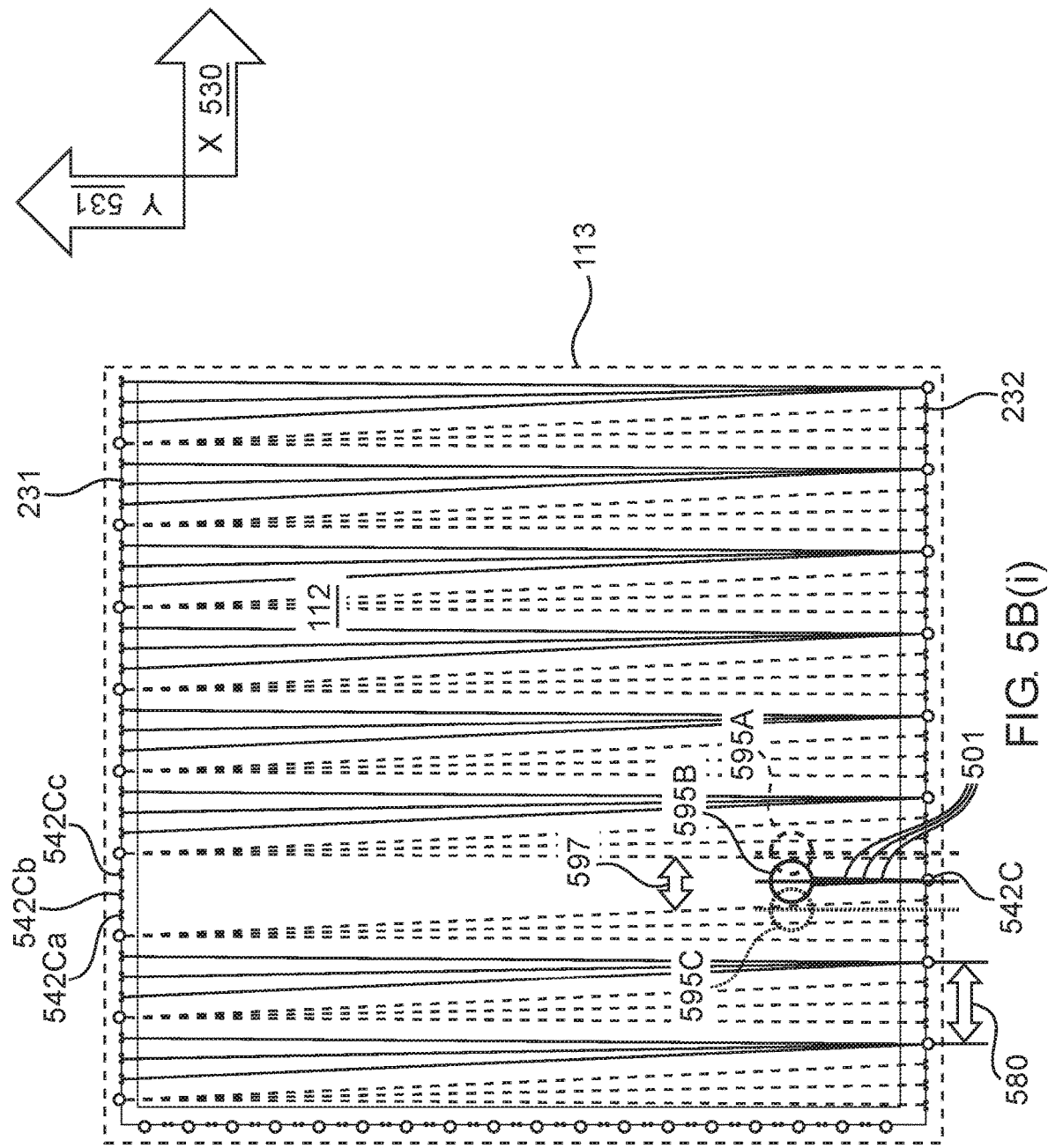
FIG. 5B(i) schematically illustrates inaccuracies in bottom-to-top touch location determination, in accordance with some exemplary embodiments of the disclosed subject matter.

Referring now to FIG. 5B(i), schematically illustrating a detection of a touch event and the inaccuracies in bottomto-top touch location determination, in accordance with some exemplary embodiments of the disclosed subject matter.

For example, when a touch event by a small stylus 595 occurs near the bottom array (in this example array 242), all light paths 501 from the nearby LED 542C are blocked. In the depicted example, all three corresponding light sensors 542Ca, 542Cb, and 542Cc report reduced or no light direct detection.

In a bottom-to-top scan, the distances between light paths 501 near the bottom array 232 is only slightly smaller than the distance between adjacent LEDs 542X.

From the depicted example, it is shown that the system thus cannot resolve the situation wherein the touching object is in position 595A, 595Bb or 595C as all these positions blocks paths from LED 542C and only from LED 542C. Thus, X coordinate inaccuracy 597 exists in the determination of the location of the touching object.

Additionally, if the touching object is substantially smaller than the distance 580 between adjacent LEDs, it may avoid being detected if it is position so as not to block any path 501. For example, the TS can be constructed to assure detection and location determination if the screen is touched by an object having minimal dimensions of width (in the X direction) and length (in the Y directions) larger than ⅛" (3.175 mm) Different minimal dimensions can be achieved by selecting the maximal separation between adjacent light sensors and LEDs.

For this reason, when a touch occurs near the bottom array, a top-to-bottom scam is advantageous as in this case, the distances between light paths near the bottom array is comparable to the distance between (the more closely packed) light sensors 542Xx.

Referring now to FIG. 5B(ii), schematically illustrating inaccuracies in top-to-bottom touch location determination, in accordance with some exemplary embodiments of the disclosed subject matter.

In the depicted example seen here, a touch event occurs near the bottom array (in this example array 242). In this example, only two light paths 501 from the top LED are blocked, and the two corresponding bottom light sensors report reduced or no light detection.

From the depicted example, it can be seen that the system thus, cannot resolve the situation wherein the touching object is in position 590a, or 590c as same paths 511 are blocked in these two positions. However, in this case, the X coordinate inaccuracy 598 in the determination of the location of the touching object is substantially smaller than the distance between two adjacent LEDs. Similarly, only if the touching object is substantially smaller than the distance 599 between adjacent light sensors (which is smaller than the distance 580 between adjacent LEDs) it may avoid being detected.

It should be noted that the touching object can obstruct light sensor corresponding to more than one LED. In the exemplary embodiment, valid touch event is defined as obstructing a group of adjacent light sensors, and a multiple simultaneous spatially separated touch events are reported as an illegal event. In each case, the coordinate of the touch is determined by the centroid of the group of obstructed light sensors.

From FIGS. 5B(i) and 5B(ii), it is clear that a better resolution is generally achieved for a touch event closer to the light sensors or at the zone in the center of the TS in the Y direction 531.

Combining the information from both top-to-bottom and bottom-to-top scan thus can increase the resolution in some cases, as demonstrated in FIG. 5B(ii) in which light from a LED 542C is blocked when the touching object is in position 590a, but not when the touching object is in position 590c.

Thus, whenever a touch event is detected, the X coordinate is preferably reported after: a) both top-to-bottom and bottom-to-top scans were performed, or b) it was determined that the touch event occurred close enough to the active light sensors. An exception to this rule may be established, for example, in cases of a very fast response, requiring a touch event on an icon displayed on the TS, which is large enough so that accurate coordinate determination is not critical.

Referring now to FIG. 6 schematically illustrating side-to-side scan for touch location determination in the Y direction, in accordance with some exemplary embodiments of the disclosed subject matter.

Once a touch was detected in the sequence depicted in FIG. 5B (for example as in 5B(i) or FIG. 5B(ii)), the system enters a mode of X and Y coordinates determination.

At this stage, the right side screen 111 or left side screen 112 that were touched, are known.

A side-to-side scan, for determining the Y coordinate 531 is then commenced for the touched side of the TS.

In FIG. 6, it is assumed that the touch event 591 is detected in the left side 112 of the TS. Symmetric scan commences if the right side 111 was touched.

In the depicted example, since touch was detected on the left side 112 of the TS, LEDs 410Rx in the right array 221 are activated one after the other in sequence. For example 410Ra, followed by 410Rb, 401Rc etc. Each time a LED is activated, the state of the corresponding light sensors on the left array 222 are probed (as detailed in FIG. 4B), and report their state: "detecting the LED light" or "light from the LED is blocked" to the controller controlling the TS. For example, light sensors 420La, 420Lb and 420Lc are associated with LED 410Ra, light sensors 420Lb, 420Lc and 420Ld are associated with LED 410Rb, etc.

Optionally, the Y coordinate 531 of the touch is determined by the centroid of the group of obstructed light sensors. If the touch was detected using the activation of the LEDs in the array (bottom or top array) that is closer to the touch, a "horizontal scan" (that is a "top-to-bottom", or a "bottom-to-top" scan) is performed, activating the array having its LEDs further away from the touch in order to decrease the inaccuracy in the determination of the X coordinate 530 (as detailed in FIGS. 5B(i) and 5B(ii)). The resolution is determined by the distance 790 between adjacent light sensors.

Alternatively, determination of the coordinates is reported after at least all "top-to-bottom", "bottom-to-top" and the appropriate "side-to-side" scans were completed.

Location of the touch in the two dimensions X and Y (2D) is done by combining the results of the determined X value and Y value.

Scanning sequence continues to determine:
a) movement of the touching object, and
b) termination of the touch event by lifting the touching object.

Once the touch event has been terminated, the system reverts to stand-by state, repeatedly performing top-to-bottom and bottom-to-top scans until the next touch event is detected.

Referring now to FIG. 7A, schematically illustrating a horizontal cross section of the TS, showing distance of the vertical light paths from the surface of the touch screen, in accordance with some exemplary embodiments of the disclosed subject matter.

Since the LEDs 410 and the light sensors 420 in top and bottom arrays 231, 241, 232, 242 are in one row (see enlargement 470 in FIG. 4A), the vertical light paths 501Vt (from top to bottom) and 501Vb (from bottom to top) are essentially in parallel to, and in close proximity to the surface of the TS displays 111 and 112. This prevents false detection of a touch events if an object comes close to, but not close enough to the surface of the TS.

Referring now to FIG. 7B, schematically illustrating distances of the horizontal light paths from the surface of the touch screen, in accordance with some exemplary embodiments of the disclosed subject matter.

In this situation, LEDs 410 and the light sensors 420 in side arrays 221, 222 are in two rows (see enlargement 760 in FIG. 4A), wherein the LEDs 410 are further away from the surface of the TS right side screen 111 and left side screen 112. Thus, light paths 501R (from right to left) and 501L (from left to right) are slightly slopped in respect to the surface of the TS screens.

Thus, it is optionally advantageous to use the right-to-left light paths 501R for determination of a touch on the left side 112. Additionally, the resolution determined by the closer and closely packed light sensors is better as was demonstrated in FIG. 6.

The opposite is applied for using the left-to-right light paths SOIL for determination of a touch on the right side screen 111.

Optionally, when the touch event is near the centerline 113 (for example when the X coordinate is between a preset values, for example ¼ to ¾ or between ⅓ to ⅔ or the total width of the TS screen), both right-to-left and left-to-right scans are performed and the Y coordinate is determined from the results of both scans.

Referring now to FIG. 8A schematically illustrating a cross section of a top or bottom array, in accordance with some exemplary embodiments of the disclosed subject matter.

A cross section of the TS frame 120 through one of the top or bottom arrays 231, 241, 232, or 242 is shown. Only elements that are not yet discussed will be explained in the description of the figure.

A PCB 801 carries electronic components 802 that drive and control the array of LEDs 410 and light sensors 420 is shown. Cover 250 comprises LED holes 820L, each hole is aligned with the light emitting area 411 of a LED 410 to allow the light of the LED to pass in the direction of its corresponding light sensor 420 in the opposing sensor array. The holes might also inhibit light from the LED to spread in angles that are larger than needed and interfere with the operation of light sensors not associated with that specific LED.

Cover 250 further comprises sensor holes 820S, each hole is aligned with the active area of a light sensor 420 to allow the light of the corresponding LED in the opposing sensor array to pass in the direction of the light sensors 420. The holes might also inhibit ambient light from the cockpit or the sun, or light from an LED if not associated with that light sensor, from arriving at the active area of the light sensor. Guards 199 are seen to protrude from cover 250.

An optical filter 810 (to be further discussed in FIGS. 9A and 9B) is placed between the sensor holes 820S and the light sensor 420. In the depicted embodiment, the optical filter 810 is in the form of a strip placed in front of the entire array and is also used for protecting the array from dust and moisture. The filter 810 is a long pass optical filter designed to be substantially transparent at the wavelength of the LEDs, while blocking large portions of the sun's visible and near IR radiation (shown in FIG. 9B).

Referring now to FIG. 8B schematically illustrating an isometric view of the frame and covers of both types of arrays, in accordance with some exemplary embodiments of the disclosed subject matter. The isometric view shows the cover on both types of top/bottom and side arrays.

The single row of holes 820L and 820S are seen in front of the (hidden) top/bottom arrays 231, 241, 232, or 242; while bottom row of light sensors holes 820S and a top row of LED hole 820L are shown in front of the (hidden) side arrays 221 or 222.

Optionally, the cover 250 is the filter 810 itself, and the holes 820X are gaps in opaque paint applied to the filter.

In the depicted example seen in this figure, along the top or bottom edges (231, 241, 232, 242) the distances between the center of windows 820L and the adjacent 820S is the same as the distances between two adjacent windows 820S. The centers of the corresponding optical elements (LEDs 410 and light sensors 420) are similarly equally spaced.

In the depicted example seen in this figure, along the side edges (221, 222) a LED window 820L is located above each light sensor window 820S. The corresponding optical elements (LEDs 410 and light sensors 420) are similarly equally spaced.

It should be noted that the spacing of the windows and the optical elements can be selected to provide the necessary touch location resolution and the minimal size of touching stylus. For example, LED window 820L can be located at other position than directly above a light sensor window 820S, for example, above the gap between two adjacent light sensor windows 820S.

Figure 9A:
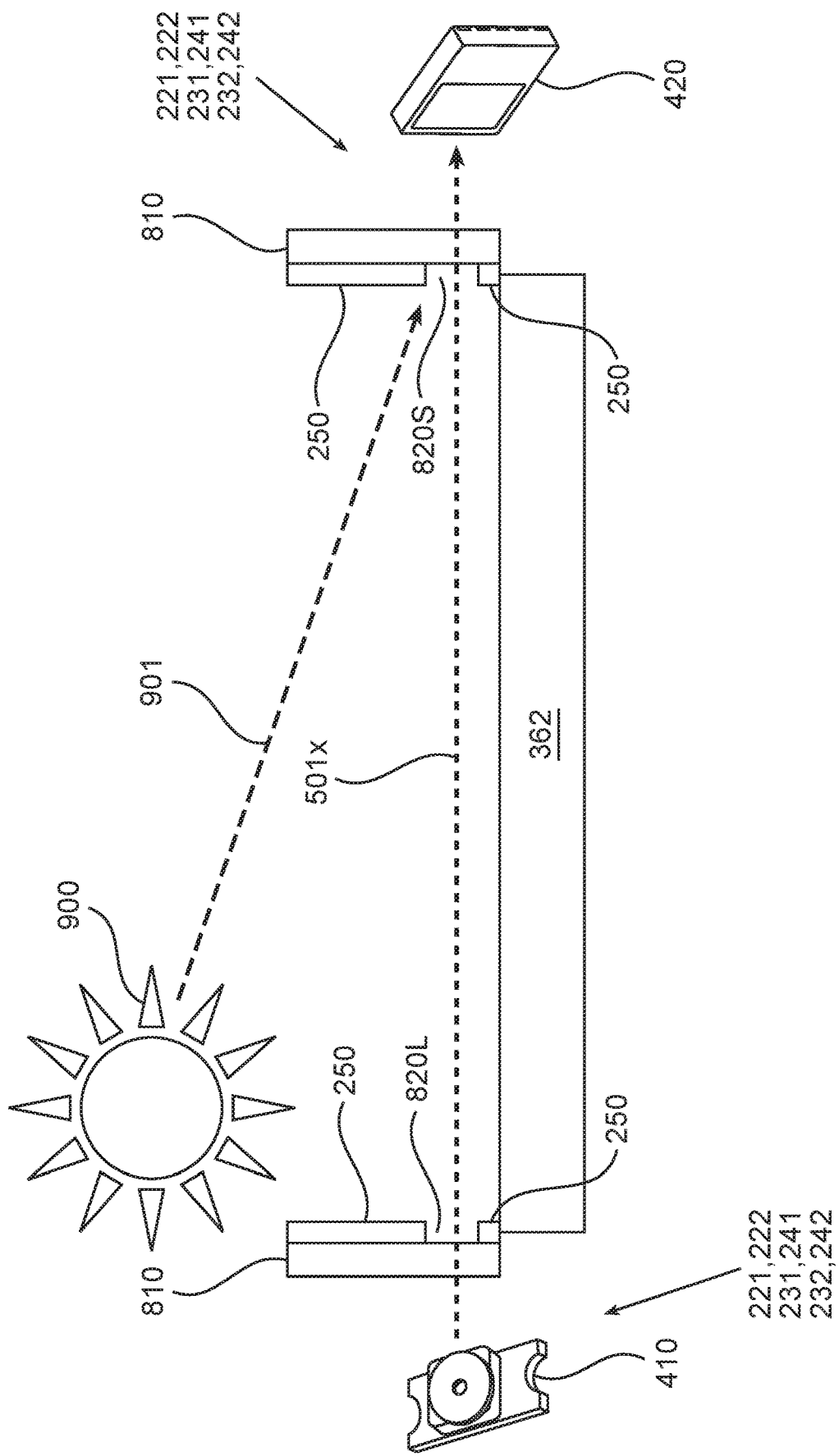
FIG. 9A(i) schematically illustrates the use of covers and filters to reduce interference of sunlight with the operation of the display unit, in accordance with some exemplary embodiments of the disclosed subject matter.

Referring now to FIG. 9A(i) schematically illustrating the use of covers and filters to reduce interference of sunlight with the operation of the display unit, in accordance with some exemplary embodiments of the disclosed subject matter.

It can be seen how the use of filter 810 (to be more detailed in FIG. 9B) reduces the interference of ambient or sun light 901 from the sun 900 with the operation of light detector 420. Additionally, cover 250 can also reduce the interference of ambient or sun light 901 from the sun 900 with the operation of light detector 420 as window 820 may act to limit the angular acceptance range of light detector 420, blocking at least some of sun light 901.

Referring now to FIG. 9A(ii) schematically illustrating the use of tilted filters to deflect reflected light away from the ST, in accordance with some exemplary embodiments of the disclosed subject matter.

By optionally tilting filter 810 and/or cover 250 by an angle 998, light 501x is reflected 999 in a direction away from the TS, thus reducing the probability of reflected light arriving to, and interfering with the operation of a light sensors. Angle 998 can be for example 45 degrees, however other values may be used.

Figure 9B:
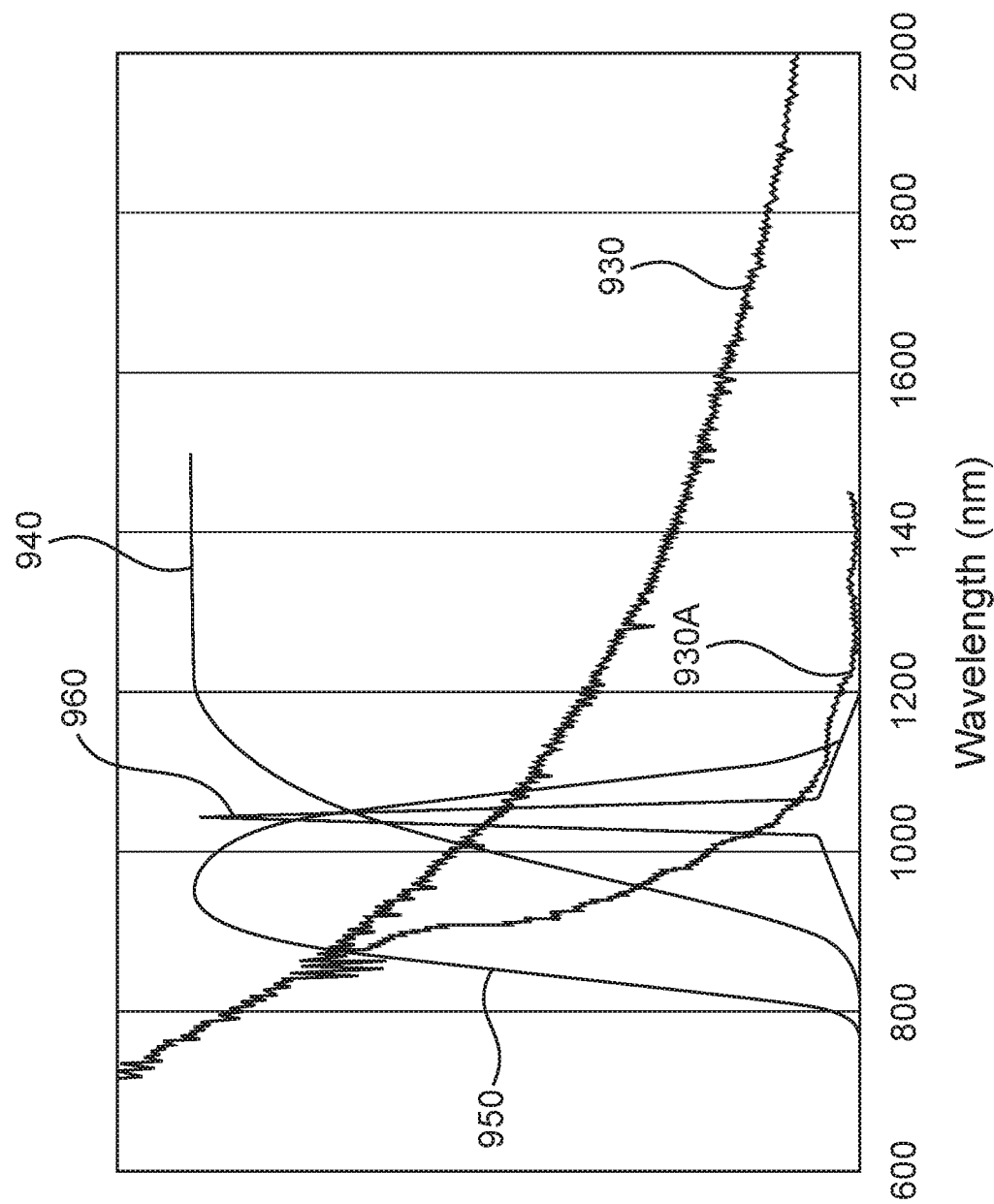
FIG. 9B schematically illustrates spectral filtering of sunlight, in accordance with some exemplary embodiments of the disclosed subject matter.

Referring now to FIG. 9B schematically illustrating spectral filtering of sunlight, in accordance with some exemplary embodiments of the disclosed subject matter. The original spectrum of sunlight 930, the attenuated spectrum of sunlight 930A, the transmission curve 940 of filter 810, the spectral response 950 of light sensor 420 are plotted against wavelength in nanometers. The graph is not to scale.

As can be seen, most of the radiation 930 from the sun is rejected by the combination of filter transmission 940 and light sensor spectral response 950.

In a non-limiting embodiment, the filter used is an RG-1000 long-pass colored glass filter. Alternatively, a plastic filter is used. Optionally, the filter is antireflection coated to increase its transmission and/or reduce reflection of LED light. Optionally, plastic filter can be made to form structural element or elements of the frame and/or the cover.

It should be noted that in bright daylight, and specifically in high altitudes, and/or fast maneuvering airplane, the sunlight may saturate the light detectors such that no change of signal is produced when the screen is touched. Additionally, temperature of the display, when mounted in a cockpit can very over a wide range, for example between −30° C. to +85° C. The sensitivity of the light sensors is affected by temperature and this can cause errors due to inability to sense the touch or saturation.

To overcome the risk of light sensor saturation, sunlight filtering is used. Additionally, each LED is powered in strong, short bursts (optionally well above the capability of continuous powering of the LED) in order to achieve good signal to noise ratios. The light sensors use "tuned detection" in which the light signal is AC coupled and is sensitive to the fast variations caused by the train of pulses emitted by the LED and less sensitive to the slow variations in ambient light. Optionally, the light signal is electronically filtered at the frequency range of train of train of pulses emitted by the LED.

However, using high power LED light increases the risk of LED light bounces or scattered off around an intentional light obstacle such as a stylus or a finger such that a valid touch may be undetected. Guards 199 reduce this risk by limiting the range of angles that light may exit the LED and/or the acceptance angle that light may reach the light sensors.

Figure 10:
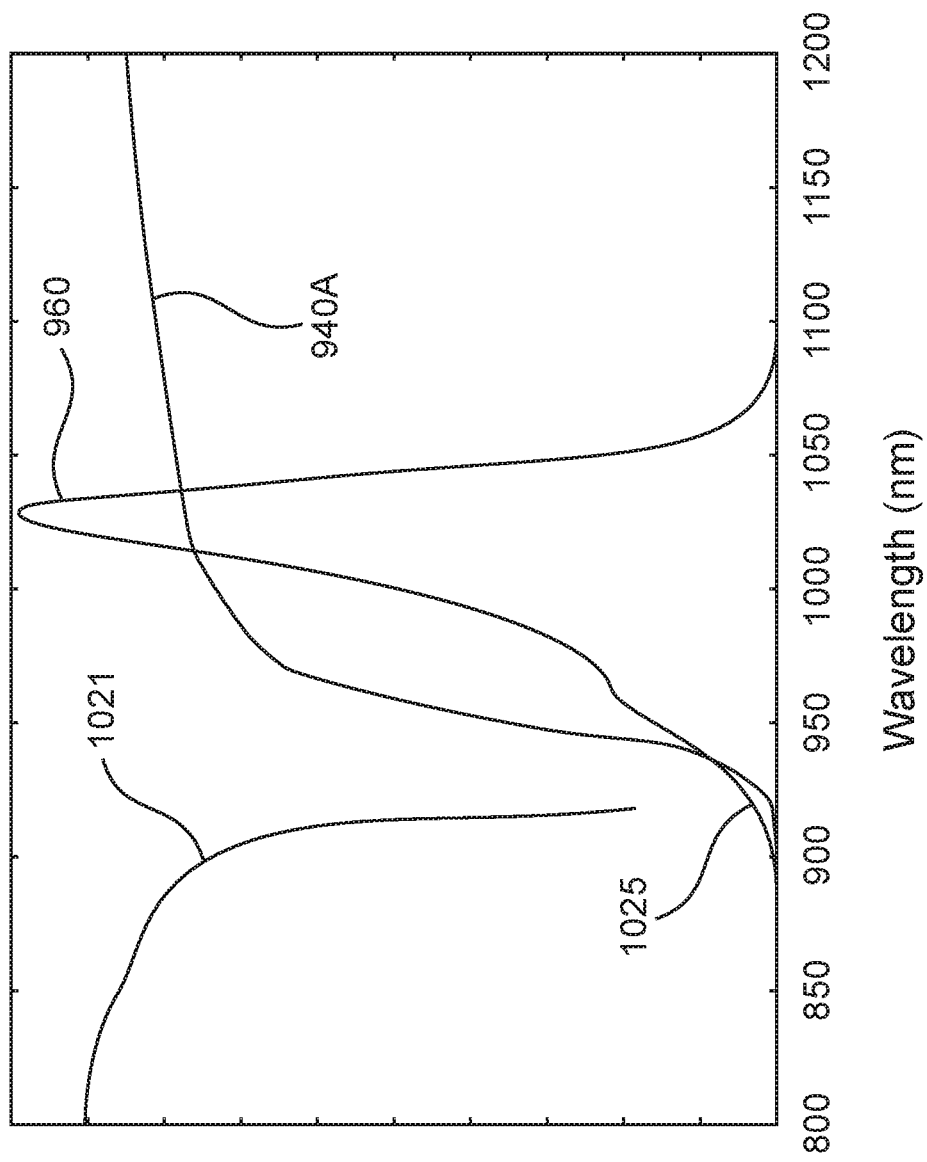
FIG. 10 schematically demonstrates the spectral computability of the display unit with night vision goggles, in accordance with some exemplary embodiments of the disclosed subject matter.

Referring now to FIG. 10 schematically demonstrating the spectral compatibility of the display unit with night vision system in accordance with some exemplary embodiments of the disclosed subject matter.

In some embodiments, TS unit 100 is used while the user is wearing night vision system FIG. 10 plots the long wavelength edge of We acceptance spectra 1021 of an NVIS the emission peak 960 of LED 419, and the attenuation spectra 940A of a long pass filter.

The nominal emission peak 960 of LED 419 is well outside the acceptance spectra 1021 of the NVIS. However, it should be noted that LED emission may have a short wavelength tail 1025. Additionally, there are manufacturing variations among LED, for example LED with nominal peak of 1050 nm may have +/−50 nm spread in peak wavelength. Additionally, peak wavelength may shift with temperature. Since NVIS are highly sensitive, it may be advantageous to use an attenuation long wavelength filter to keep the LED light, from blinding the NVIS. The attenuation spectrum 940A of the filter used in front of the LED may be the same or different than the attenuation spectrum 940 of the filter used in front of the light sensors.

It should be noted that the disclosed subject matter uses at least one, and optionally a plurality of components and methods to improve the operation. These can be grouped to two general groups:
  a) Mechanical obstacle comprising at least one of: guard protrusions 199, filters 810, and windows 820.
  b) Electro-optical components and methods comprising at least one of: powering the LEDs in strong short bursts, and operating the light sensors in tuned detection, performing light background subtraction, temperature compensation, and automatic gain control.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A touch screen (TS) apparatus comprising:
    a display;
    a frame with at least a first edge, a second edge, a third edge and a fourth edge around the display, wherein the first edge and the second edge are positioned opposite each other, and the third edge and the fourth edge are positioned opposite each other;
    at least a first sensor array and at least a second sensor array, wherein each of the sensor arrays has a plurality of light transmitters and a plurality of light sensors, and wherein the at least first sensor array and the at least second sensor array are disposed on the first edge and the second edge of the frame, respectively, wherein the transmitters of the first sensor array are facing the light sensors on the second sensor array positioned on two opposing edges of the frame; and
    at least one physical obstacle, located on at least one of the third edge or the fourth edge, for reducing stray light scattered or reflected by said at least one of the third edge or the fourth edge and arriving to the light sensors,
    wherein the at least one physical obstacle is a plurality of guards that are thin opaque sheets inwardly protruding and normal to the edges to which they are attached or normal to the cover, and
    wherein light from each of the light transmitters in one of the first sensor array and the second sensor array is directed along a direct light path to be detected by at least one light sensor of other sensor array, and wherein when at least one direct path between one of the light transmitters in one sensor array and at least one corresponding light sensor of the other sensor array is blocked, a touch event is detected, and a location of the touch event is determined based on a location of the direct path that is blocked.

2. The TS apparatus as claimed in claim 1, wherein the guards are placed between two adjacent light sensors or two adjacent light transmitters.

3. The TS apparatus as claimed in claim 1, wherein the guards have a length between 1 mm and 5 mm.

4. The TS apparatus as claimed in claim 1, wherein the cover further comprises a corresponding window positioned in front of each of the light transmitters for limiting spread of light transmitted by said light transmitters.

5. The TS apparatus as claimed in claim 1, wherein the cover is in a right angle to the display or tilted outwardly in respect to the display.

6. The TS apparatus as claimed in claim 1, wherein the light transmitters are sequentially powered to transmit a burst of light pulses.

7. The TS apparatus as claimed in claim 1, wherein the physical obstacle prevents the light sensor from saturation when the TS is operating while exposed to sunlight is an optical filter for blocking light having wavelength shorter than the light transmitted by the light transmitters.

8. The TS apparatus as claimed in claim 1, wherein the physical obstacle that prevents the light sensors from saturation when the TS is operating while exposed to sunlight is an optical filter for blocking light having wavelength shorter than the sensitivity wavelength of a night vision system.

9. The TS apparatus as claimed in claim 1, wherein each of the sensor arrays is organized to have repeating groups comprising three light sensors and one light transmitter.

10. The TS apparatus as claimed in claim 1, wherein the display comprises two halves: a left side screen and a right side screen.

11. The TS apparatus as claimed in claim 10, wherein the display is a rectangular display divided to a first side and a second side located one aside the other, the rectangular display having four edges such that a first edge and an opposing second edge are longer than a third edge and an opposing forth edge, and
wherein the first and the second sensor arrays are located opposite each other along the first edge and an opposing second edge, respectively, near the first side of the display,
the TS further comprising:
at least a third sensor array and at least a fourth sensor array along the first edge and an opposing second edge, respectively, near the second side of the display; and
at least a fifth sensor array and at least a sixth sensor array positioned near the first side along the third edge and near the second side along the fourth edge, respectively, wherein each one of the sensor arrays comprises light transmitters and light sensors.

12. The TS apparatus as claimed in claim 1, wherein said at least one physical obstacle further comprises an optical filter placed in front of the light transmitters or placed in front of the light sensors.

13. A sensor array for detecting and locating a touch event on a touch screen (TS) having at least a first edge, a second edge, a third edge, and a fourth edge around a touch active surface, wherein the first edge and the second edge are opposing each other, and the third edge and the fourth edge are opposing each other, and having at least a first sensor array and a second sensor array positioned on the first edge and the second edge, respectively, each of the sensor arrays comprising:
a plurality of light sensors organized in a light sensors' row configured to be positioned adjacent to the touch active surface of the TS; and
a plurality of light transmitters organized in a transmitters' row positioned adjacent to and above the light sensors' row in respect to the touch active surface,
wherein light from at least one of the light transmitters of one of the sensor arrays forms at least one direct path of light that is detected by at least one light sensor in another sensor array oppositely positioned,
wherein when the touch active surface of the TS is touched by a touching object, the at least one direct path of light is blocked, the touch event is detected, and
wherein the location of the touch event is determined based on the location of the at least one direct path of light that is blocked; and
a plurality of guards that are thin opaque sheets inwardly protruding from at least one of the third edge or the fourth edge and normal to the edges to which they are attached or normal to the cover, for reducing stray light arriving to the light sensors,
wherein said stray light is light that is:
emitted by a transmitter of the plurality of light transmitters of the first sensor array,
scattered or reflected by structure on at least one of the third edge or the fourth edge, and
detected by a light sensor on the second sensor array.

14. The sensor array as claimed in claim 13, wherein the touching object is an opaque object capable of blocking the at least one direct path of light.

15. The sensor array as claimed in claim 13, wherein the opaque object is detected when it touches any location on the active surface of the TS.

16. A method of detecting a location of a touch event in a rectangular touch screen (TS) apparatus having a rectangular display divided to a first side and a second side located one aside the other, the rectangular display has at least a first edge, a second edge, a third edge, and a fourth edge such that the first edge and the second edge that opposes the first edge are longer than the third edge and the fourth edge that opposes the third edge; the TS further has at least a first sensor array and at least a third sensor array, positioned near the first side and the second side of the display, respectively, and along the first edge; at least a second sensor array and at least a forth sensor array, positioned near the first side and the second side, respectively, along the second edge; at least a fifth sensor array and at least a sixth sensor array, positioned near the first side along the third edge and near the second side along the fourth edge, respectively, wherein each one of the sensor arrays comprises light transmitters and light sensors;
the method comprising:
a first sequence comprising:
concurrently activating in sequence, one at a time, the light transmitters in the first sensor array and in the third sensor array to transmit light towards light sensors in the second sensor array and the fourth sensor array, respectively, each along a direct light path; and
determining if at least one direct light path of the direct light paths between any of the light transmitters in the first sensor array and the light sensors in the second sensor array is blocked;
if during the first sequence, at least one direct light path is blocked, starting a third sequence wherein the third sequence comprises:
activating in sequence, one at a time, the light transmitters in the sixth sensor array to transmit light towards light sensors in the fifth sensor array;
determining which of the direct light paths is blocked; and
determining the location of the touch event based on the at least one direct light path that is blocked;
if the direct light path that is blocked is between a light transmitter that is activated in the third sensor array and a light sensor in the fourth sensor array, starting a fourth sequence comprising:
activating in sequence, one at a time, the light transmitters in the fifth sensor array to transmit light towards light sensors in the sixth sensor array;
determining which of the direct light path or direct light paths are blocked; and
determining the location of the touch event based on the at least one direct light path that is blocked;
and
if during the first sequence no direct light path is determined to be blocked, starting a second sequence comprising:
concurrently activating in sequence, one at a time, the light transmitters in the second sensor array and forth sensor array to transmit light towards light sensors in the first sensor array and the third sensor array, respectively; and determining if a direct light path between any of the light transmitters in the second sensor array and the fourth sensor array and the light sensors in the first sensor array and the fourth sensor array, respectively, is blocked;

if during the second sequence:

a direct light path is blocked between a light transmitter in the second sensor array and a light sensor in the first sensor array, starting the third sequence;

if during the second sequence:

a direct light path is blocked between a light transmitter in the fourth sensor array and a light sensor in the third sensor array, starting the fourth sequence; and if during the second sequence no direct light path is blocked, starting first sequence again.

17. The method as claimed in claim 16, further comprising:

if during the third sequence or the fourth sequence following the first sequence, at least one direct path is determined to be blocked from the light transmitters closer to the first sensor array or the third sensor array, starting the second sequence; and updating the location of the touch event based on the direct light path that is blocked; and if during the third sequence or a fourth sequence following the second sequence, a direct path is determined to be blocked from the light transmitter closer to the second sensor array or the fourth sensor array, starting the first sequence; and updating the location of the touch event based on at least one direct light path that is blocked.

18. The method as claimed in claim 16, further comprising:

if the touch event is no longer detected, returning to the first sequence.

19. A touch screen (TS) apparatus comprising:

a display;

a frame with at least a first edge, a second edge, a third edge and a fourth edge around the display, wherein the first edge and the second edge are positioned opposite each other, and the third edge and the fourth edge are positioned opposite each other;

at least a first sensor array and at least a second sensor array, wherein each of the sensor arrays has a plurality of light transmitters and a plurality of light sensors, and wherein the at least first sensor array and the at least second sensor array are disposed on the first edge and the second edge of the frame, respectively, wherein the transmitters of the first sensor array are facing the light sensors on the second sensor array positioned on two opposing edges of the frame; and at least one physical obstacle, located on at least one of the third edge or the fourth edge for reducing stray light scattered or reflected by said at least one of the third edge or the fourth edge and arriving to the light sensors, wherein the at least one physical obstacle is a plurality of windows positioned on the cover and in front of each of the light transmitters, and wherein light from each of the light transmitters in one of the first sensor array and the second sensor array is directed along a direct light path to be detected by at least one light sensor of other sensor array, and wherein when at least one direct path between one of the light transmitters in one sensor array and at least one corresponding light sensor of the other sensor array is blocked, a touch event is detected, and a location of the touch event is determined based on a location of the direct path that is blocked.

20. A touch screen (TS) apparatus comprising:

a display;

a frame with at least a first edge, a second edge, a third edge and a fourth edge around the display, wherein the first edge and the second edge are positioned opposite each other, and the third edge and the fourth edge are positioned opposite each other;

at least a first sensor array and at least a second sensor array, wherein each of the sensor arrays has a plurality of light transmitters and a plurality of light sensors, and wherein the at least first sensor array and the at least second sensor array are disposed on the first edge and the second edge of the frame, respectively, wherein the transmitters of the first sensor array are facing the light sensors on the second sensor array positioned on two opposing edges of the frame; and at least one physical obstacle, located on at least one of the third edge or the fourth edge, inwardly positioned for reducing stray light scattered or reflected by said at least one of the third edge or the fourth edge and arriving to the light sensors, wherein the at least one physical obstacle is an optical filter placed in front of the light transmitters or placed in front of the light sensors, and wherein light from each of the light transmitters in one of the first sensor array and the second sensor array is directed along a direct light path to be detected by at least one light sensor of other sensor array, and wherein when at least one direct path between one of the light transmitters in one sensor array and at least one corresponding light sensor of the other sensor array is blocked, a touch event is detected, and a location of the touch event is determined based on a location of the direct path that is blocked.

* * * * *